(12) United States Patent
Srinivasan et al.

(10) Patent No.: US 8,319,784 B2
(45) Date of Patent: Nov. 27, 2012

(54) FAST RECONFIGURATION OF GRAPHICS PIPELINE STATE

(75) Inventors: Ramanujan Srinivasan, Seattle, WA (US); Relja Markovic, Seattle, WA (US); Samuel Glassenberg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/224,845

(22) Filed: Sep. 2, 2011

(65) Prior Publication Data

US 2011/0316871 A1    Dec. 29, 2011

Related U.S. Application Data

(63) Continuation of application No. 11/477,272, filed on Jun. 28, 2006, now Pat. No. 8,111,260.

(51) Int. Cl.
   *G06F 12/02* (2006.01)
(52) U.S. Cl. ....................................... 345/543
(58) Field of Classification Search ........................ None
   See application file for complete search history.

(56) References Cited

U.S. PATENT DOCUMENTS

| | | | |
|---|---|---|---|
| 6,070,202 A * | 5/2000 | Minkoff et al. | 710/56 |
| 6,189,105 B1 | 2/2001 | Lopes | |
| 6,243,107 B1 | 6/2001 | Valtin et al. | |
| 6,295,608 B1 | 9/2001 | Parkes et al. | |
| 6,374,145 B1 | 4/2002 | Lignoul | |
| 6,427,234 B1 * | 7/2002 | Chambers et al. | 717/140 |
| 6,560,711 B1 | 5/2003 | Given et al. | |
| 6,631,423 B1 | 10/2003 | Brown et al. | |
| 6,784,888 B2 | 8/2004 | Taylor et al. | |
| 6,828,978 B2 | 12/2004 | Duehler | |
| 6,910,106 B2 | 6/2005 | Sechrest et al. | |
| 6,943,800 B2 | 9/2005 | Taylor et al. | |
| 6,980,209 B1 | 12/2005 | Donham et al. | |
| 7,385,607 B2 | 6/2008 | Bastos et al. | |
| 7,451,432 B2 | 11/2008 | Shukla et al. | |
| 7,546,602 B2 | 6/2009 | Hejlsberg et al. | |
| 2001/0005209 A1 | 6/2001 | Lindholm et al. | |
| 2002/0021307 A1 | 2/2002 | Glenn et al. | |
| 2003/0084322 A1 | 5/2003 | Schertz et al. | |
| 2004/0003370 A1 | 1/2004 | Schenk et al. | |
| 2004/0068627 A1 | 4/2004 | Sechrest et al. | |
| 2004/0237074 A1 | 11/2004 | Aronson et al. | |
| 2005/0097595 A1 | 5/2005 | Lipsanen et al. | |
| 2005/0105698 A1 | 5/2005 | Patfield | |
| 2005/0182962 A1 | 8/2005 | Given et al. | |
| 2005/0184853 A1 | 8/2005 | Payne et al. | |
| 2005/0243094 A1 | 11/2005 | Patel et al. | |
| 2006/0023915 A1 | 2/2006 | Aalbu et al. | |
| 2006/0055695 A1 | 3/2006 | Abdalla et al. | |

(Continued)

OTHER PUBLICATIONS

D.W. Wall; Global Register Allocation at Link Time; Proceedings of SIGPLAN'86; ACM; Jul. 1986.*

(Continued)

*Primary Examiner* — Kee M Tung
*Assistant Examiner* — Carlos Perromat
(74) *Attorney, Agent, or Firm* — Microsoft Corporation

(57) ABSTRACT

Techniques and technologies are provided for binding resources to particular slots associated with shaders in a graphics pipeline. Resource dependencies between resources being utilized by respective shaders can be determined, and, based on these resource dependencies, common resource/slot associations can be computed. Respective common resource/slot associations identify a particular one of the resources to be associated with a particular one of the slots.

19 Claims, 10 Drawing Sheets

U.S. PATENT DOCUMENTS

2006/0074736 A1     4/2006    Shukla et al.
2007/0220525 A1*   9/2007    State et al. .................... 718/107
2007/0234308 A1    10/2007   Feigenbaum et al.

OTHER PUBLICATIONS

R. Motwani et al.; Combining Register Allocation and Instruction Scheduling; Courant Institute, New York University; Jul. 1995.*
A.G.M Cilio et al; Global Variable Promotion: Using Registers to Reduce Cache Power Dissipation, LNCS 2304, pp. 247-261, Springer-Verlag Berlin Heidelberg; 2002.*
W. Ambrosch et al.; Dependence-Concious Global Register Allocation, Lecture Notes in Computer Science, vol. 782, Springer Berlin Heidelberg, 1994.*
Notice of Allowance cited in U.S. Appl. No. 11/478,285 dated Oct. 12, 2010, 6 pgs.
Preliminary Amendment cited in U.S. Appl. No. 11/478,285 dated Jan. 21, 2011, 9 pgs.
Notice of Allowance cited in U.S. Appl. No. 11/478,285 dated Sep. 20, 2011, 7 pgs.
Non-Final Office Action cited in U.S. Appl. No. 11/477,609 dated Aug. 17, 2009, 22 pgs.
Reply to Non-Final Office Action cited in U.S. Appl. No. 11/477,609 dated Nov. 2, 2009, 15 pgs.
Final Office Action cited in U.S. Appl. No. 11/477,609 dated Nov. 12, 2009, 21 pgs.
Reply to Final Office Action cited in U.S. Appl. No. 11/477,609 dated Dec. 10, 2009, 10 pgs.
Non-Final Office Action cited in U.S. Appl. No. 11/477,609 dated Dec. 24, 2008, 21 pgs.
Reply to Non-Final Office Action cited in U.S. Appl. No. 11/477,609 dated Mar. 23, 2009, 16 pgs.
Final Office Action cited in U.S. Appl. No. 11/477,609 dated May 14, 2009, 21 pgs.
Rely to Final Office Action cited in U.S. Appl. No. 11/477,609 dated Jul. 27, 2009, 18 pgs.
Notice of Allowance cited in U.S. Appl. No. 11/477,609 dated Jan. 12, 2010, 9 pgs.
PLUS Search Results cited in U.S. Appl. No. 11/477,609 dated Aug. 19, 2008, 2 pgs.
Non-Final Office Action cited in U.S. Appl. No. 11/477,272 dated Mar. 11, 2009, 17 pgs.
Reply to Non-Final Office Action cited in U.S. Appl. No. 11/477,272 dated May 19, 2009, 14 pgs.
Final Office Action cited in U.S. Appl. No. 11/477,272 dated Aug. 24, 2009, 22 pgs.
Reply to Final Office Action cited in U.S. Appl. No. 11/477,272 dated Oct. 26, 2009, 13 pgs.
Non-Final Office Action cited in U.S. Appl. No. 11/477,272 dated Dec. 30, 2009, 19 pgs.
Reply to Non-Final Office Action cited in U.S. Appl. No. 11/477,272 dated Mar. 12, 2010, 13 pgs.
Final Office Action cited in U.S. Appl. No. 11/477,272 dated Apr. 30, 2010, 20 pgs.
Reply to Final Office Action cited in U.S. Appl. No. 11/477,272 dated Jun. 25, 2010, 13 pgs.
Non-Final Office Action cited in U.S. Appl. No. 11/477,272 dated Aug. 3, 2010, 24 pgs.
Reply to Non-Final Office Action cited in U.S. Appl. No. 11/477,272 dated Nov. 17, 2010, 19 pgs.
Notice of Allowance cited in U.S. Appl. No. 11/477,272 dated Dec. 16, 2010, 8 pgs.
Notice of Allowance cited in U.S. Appl. No. 11/477,272 dated Mar. 28, 2011, 9 pgs.
Notice of Allowance cited in U.S. Appl. No. 11/477,272 dated Aug. 11, 2011, 9 pgs.
Reply to Notice of Allowance cited in U.S. Appl. No. 11/477,272 dated Aug. 26, 2011, 9 pgs.
International Search Report cited in PCT Application No. PCT/US2007/0134410 dated Dec. 7, 2007, 7 pgs.
International Preliminary Report on Patentability cited in PCT Application No. PCT/US2007/0134410 dated Jan. 6, 2009, 8 pgs.
First Chinese Office Action cited in Chinese Application No. 2007800224522.03 dated Mar. 16, 2011, 3 pgs.
Reply to First Chinese Office Action cited in Chinese Application No. 200780024522.3 dated Jul. 28, 2011, 5 pgs.
Second Chinese Office Action cited in Chinese Application No. 200780024522.3 dated Mar. 12, 2012, 6 pgs.
Reply to Second Chinese Office Action cited in Chinese Application No. 200780024522.3 dated May 18, 2012, 4 pgs.
Japanese Office Action cited in Japanese Application No. 2009-518138 dated Mar. 5, 2012, 1 pg.
Reply to Japanese Office Action cited in Japanese Application No. 2009-518138 dated May 21, 2012, 2 pgs.
Korean Office Action cited in Korean Application No. 10-2008-7031260 dated May 8, 2012, 1 pg.
Mexican Office Action cited in Mexican Application No. MX/a/2008/015162 dated Jun. 6, 2011, 2 pgs.
Reply to Mexican Office Action cited in Mexican Application No. MX/a/2008/015162 dated Oct. 20, 2011, 1 pg.
"Computer Internet security protection against network security attacks", reprinted from the Internet on Apr. 7, 2006 at http://www.buildwebsite4u.com/articles/internet-security.shtml, pp. 1-5.
"Locked", James Matt, Reprinted from the Internet on Apr. 7, 2006 at http://www.sharewaresoft.com/Locked-download-2148.htm, pp. 1-3.
"User-Configurable Automatic Shader Simplification", Fabio Pellacini, International Conference on Computer Graphics and Interactive Techniques, ACM SIGGRAPH 2005 Papers, Jul. 31-Aug. 4, 2005, 8 pgs.
Chinese Notice on Grant of Patent Right cited in Chinese Application No. 200780024522.3 dated Jul. 23, 2012, 6 pgs.
Reply to Korean Office Action cited in Korean Application No. 10-2008-7031260 dated Jun. 27, 2012, 1 pg.
Korean Office Action cited in Korean Application No. 10-2008-7031260 dated Sep. 7, 2012, 2 pgs.

* cited by examiner

FAST RECONFIGURATION OF GRAPHICS PIPELINE STATE

RELATED APPLICATION

This application is a continuation of U.S. application Ser. No. 11/477,272, filed on Jun. 28, 2006, entitled "FAST RECONFIGURATION OF GRAPHICS PIPELINE STATE", at least some of which may be incorporated herein.

BACKGROUND

Rendering and displaying three dimensional (3-D) graphics on screen typically involves many calculations and computations. In a simple graphics system, such computations occur according to some level of cooperative or shared processing by the central processing unit (CPU) and the graphics processing unit (GPU). In an exemplary scenario, after instructions are processed and some initial computations occur in the CPU, a set of coordinate points or vertices that define the object to be rendered are stored in video memory for further processing by the GPU in the graphics pipeline. When graphics programmers develop graphics applications via a set of available graphics APIs, the programmer generally indicates a set of vertices to be operated upon by a set of algorithmic elements. This data is sent into the graphics pipeline, and respective vertices are streamed through a fixed set of GPU subunits in the graphics pipeline. One of these subunits, called a tesselator, breaks the graphics data down into simple polygons according to predetermined algorithms designed to efficiently cover the surface of the object being represented. Thereafter, one or more programmable shader units, sometimes referred to as shaders or "shader programs," can operate on the data and perform specialized operations on graphics data. Shaders can include, for example, vertex shader(s), geometry shader(s) and pixel shader(s).

A single shader can receive different combinations of shader constants, and depending on the combination of particular shader constants that are provided, the output generated by the shader will vary. These shader constants can specify, for example, how pixels are combined, how data is read in and out, and in the case of a texture, how values are extracted from that texture. The process of shading is a computation intensive and complex process. When these specific shaders operate in a graphics pipeline, there are regular bottlenecks due to the operations that occur in respective stages.

"State" refers to resources being interpreted by the shader program. At any given instance, the graphics pipeline comprises a tremendous amount of dynamic state (rendering state, shaders, shader constant variables, resource/memory bindings, etc.). Different combinations of state enable various simulated materials and visual effects.

One component of this state is a set of shader constants that need to be bound to the GPU before executing a shader program. Because the hardware used to implement the graphics pipeline can be in merely one configuration at any given instance, it is desirable to reduce time spent setting state (e.g., shader constants) and issuing commands to the GPU.

Some shaders utilize constant buffers (as opposed to constant registers) which hold groups or aggregations of shader constants. Constant buffers can allow shader constants to be set to the GPU more rapidly since the aggregations of shader constants are grouped together.

SUMMARY

Techniques are provided for reconfiguring a dependency tree comprising a number of resources. The dependency tree keeps track of the relationships or dependencies between different shader resources. Respective resources are bound to a slot of a parent object in the dependency tree. According to these techniques, respective dependencies in the dependency tree are scanned, and a cost associated with respective, different reconfigurations (remapping or rebuilding of shaders) of the dependency tree is computed. Respective reconfigurations of the dependency tree change the particular slots certain resources (CBs) are bound to. The particular reconfiguration of the dependency tree can then be selected that reduces or minimizes the amount of device reconfiguration to transition between higher-level states. In other words, the particular reconfiguration of the dependency tree which minimizes the number of slots that would need to be re-bound in order to transition/switch between currently loaded shaders can then be selected. In one implementation, these techniques can be performed for offline content generation and storage (e.g., if the shader set is known ahead of time, shaders are analyzed, dependencies are remapped, and then the shaders are saved back to disk). In an alternative implementation, the method is performed dynamically at application run time/load time (e.g., if the shader set is not known ahead of time).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The systems and methods for use in optimizing performance of a graphics pipeline are further described with reference to the accompanying drawings in which.

DETAILED DESCRIPTION

Figure 1:
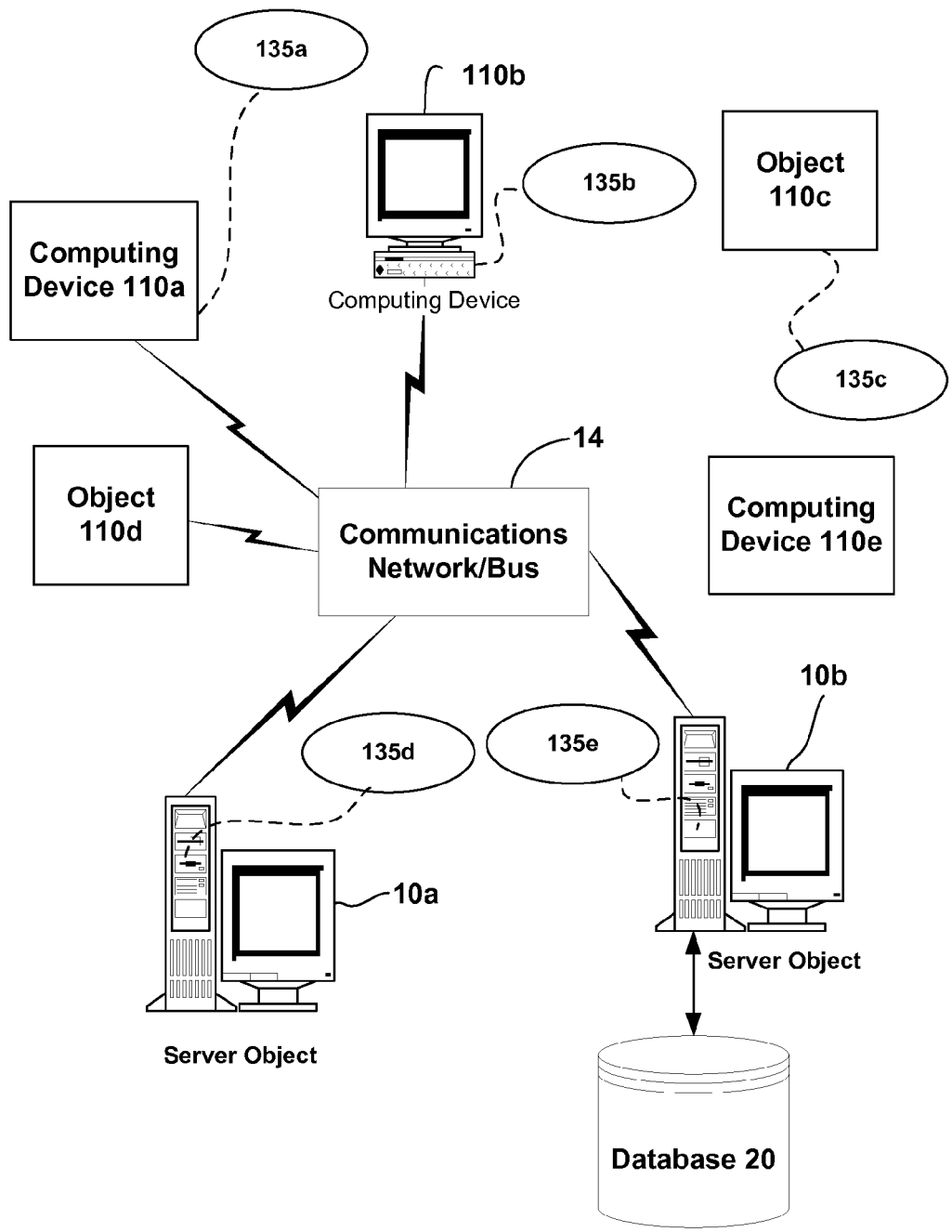
FIG. 1 is a block diagram representing an exemplary network environment having a variety of computing devices in which the disclosed subject matter can be implemented.

The following detailed description is merely exemplary in nature and is not intended to be limiting. As used herein, the word "exemplary" means "serving as an example, instance, or illustration." Any implementation described herein as "exemplary" is not necessarily to be construed as preferred or advantageous over other implementations. The implementations described below are exemplary implementations provided to enable persons skilled in the art to make or use the disclosed and/or claimed subject matter and are not intended to limit the scope of the same. Furthermore, there is no intention to be bound by any expressed or implied theory presented in the preceding background, brief summary or the following detailed description.

As used herein, the term "shader" can be used generically to refer to either a hardware subunit of a GPU that performs shading or to refer to set of instructions or tokens downloaded to the GPU that are subsequently loaded into memory, e.g., register storage, used by a shader (hardware) to perform the shading. The term "shader" can also refer to both working together. Where the term "subunit" is also used in connection with the term "shader," the term "shader" should be construed to refer to a subunit of the GPU that performs the processing associated with the shading. The term "shader program" can generally refer to computer programs or processes, that reside and run in the graphics pipeline, which can be used to help determine/define the final, on-screen surface properties of an image or object in a 3D on-screen environment. "Shaders" can perform billions of computations a second in order to perform their specific tasks.

As used herein, the term "resources" can refer to inputs used by a shader program and can encompass, for example, textures, samplers, constant buffers, or any other resource used by shader programs.

As used herein, the term "shader constant" can refer to different parameters or variables that are fed into a shader program that allow the shader program to produce different results based on the particular shader constants that are used. Shader programs can receive a range of different values for respective shader constants. Shader constant variables typically do not change values during the invocation of that shader.

Techniques are provided for tracking runtime usage patterns of shader constants, and then generating usage pattern data regarding usage patterns of shader constants. This usage pattern data can then be fed into an optimization algorithm to efficiently lay out the data for maximal performance given certain heuristics. Factors considered include, for example, frequency of client update of the values, usage by certain shaders, and size and number of the resulting buffers.

One of ordinary skill in the art can appreciate that the one or more of the features disclosed herein can be implemented in connection with a computer or other client or server device, which can be deployed as part of a computer network, or in a distributed computing environment. In this regard, the disclosed subject matter pertains to a computer system or environment having a number of memory or storage units, and a number of applications and processes occurring across a number of storage units or volumes, which can be used in connection with processes for a non-limiting implementation of a graphics pipeline. The techniques and/or systems described herein can apply to an environment with server computers and client computers deployed in a network environment or distributed computing environment, having remote or local storage. The techniques and/or systems described herein can also be applied to standalone computing devices, having programming language functionality, interpretation and execution capabilities for generating, receiving and transmitting information in connection with remote or local services. In a gaming environment, a graphics pipeline is particularly relevant to those computing devices operating in a network or distributed computing environment, and thus graphic pipeline techniques in accordance with the present disclosure can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices can have applications, objects or resources that can implicate the graphics pipeline processes of the present disclosure.

FIG. 1 provides a schematic diagram of an exemplary networked or distributed computing environment. The distributed computing environment comprises computing objects 10a, 10b, etc. and computing objects or devices 110a, 110b, 110c, etc. These objects can comprise programs, methods, data stores, programmable logic, etc. The objects can comprise portions of the same or different devices such as PDAs, audio/video devices, MP3 players, personal computers, etc. Respective objects can communicate with another object by way of the communications network 14. This network can comprise other computing objects and computing devices that provide services to the system of FIG. 2A, and can represent multiple interconnected networks. In accordance with an aspect, respective objects 10a, 10b, etc. or 110a, 110b, 110c, etc. can comprise an application that might make use of an API, or other object, software, firmware and/or hardware, to request use of the graphics pipeline processes.

It can also be appreciated that an object, such as 110c, can be hosted on another computing device 10a, 10b, etc. or 110a, 110b, etc. Thus, although the physical environment depicted can show the connected devices as computers, such illustration is merely exemplary and the physical environment can alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems can be connected together by wired or wireless systems, by local networks or widely distributed networks. Currently, many of the networks are coupled to the Internet, which provides an infrastructure for widely distributed computing and encompasses many different networks. One or more infrastructures known to those skilled in the art can be used for exemplary communications made incident to a graphics pipeline according to techniques and/or systems described herein.

In home networking environments, there are at least four disparate network transport media that can respective support a unique protocol, such as Power line, data (both wireless and wired), voice (e.g., telephone) and entertainment media. Most home control devices such as light switches and appliances can use power lines for connectivity. Data Services can enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic can enter the home either as wired (e.g., Cat 3) or wireless (e.g., cell phones) and can be distributed within the home using Cat 3 wiring. Entertainment media, or other graphical data, can enter the home either through satellite or cable and is typically distributed in the home using coaxial cable. IEEE 1394 and DVI are also digital interconnects for clusters of media devices. These network environments and others that can emerge as protocol standards can be interconnected to form a network, such as an intranet, that can be connected to the outside world by way of the Internet. In short, a variety of disparate sources exist for the storage and transmission of data, and consequently, moving forward, computing devices will require ways of sharing data, such as data accessed or utilized incident to program objects, which make use of the graphics pipeline in accordance with the techniques and/or systems provided herein.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process (e.g., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. One or more of these computing devices can be processing data or requesting services or tasks that can implicate the graphics programming techniques specific to an implementation of the graphics pipeline as provided for in the present disclosure.

A server is typically a remote computer system accessible over a remote or local network, such as the Internet. The client process can be active in a first computer system, and the server process can be active in a second computer system, communicating with one another over a communications medium, thus providing distributed functionality and allowing multiple clients to take advantage of the information-gathering capabilities of the server. One or more software objects utilized pursuant to the graphics programming techniques of the graphics pipeline can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to one other. The network address can be referred to as a URL address. Communication can be provided over a communications medium, e.g., client(s) and server(s) can be coupled to one another via TCP/IP connection(s) for high-capacity communication.

Thus, FIG. 1 illustrates an exemplary networked or distributed environment, with a server in communication with client computers via a network/bus, in which the techniques and/or systems provided herein can be employed. In more detail, a number of servers 10a, 10b, etc., are interconnected via a communications network/bus 14, which can be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the techniques and/or systems described herein. It is thus contemplated that the techniques and/or systems described herein can apply to any computing device in connection with which it is desirable to implement a graphics interface employing a graphics pipeline as described herein.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. can also serve as clients 110a, 110b, 110c, 110d, 110e, etc., as can be characteristic of a distributed computing environment. Communications can be wired or wireless, where appropriate. Client devices 110a, 110b, 110c, 110d, 110e, etc. can or cannot communicate via communications network/bus 14, and can have independent communications associated therewith. For example, in the case of a TV or VCR, there can or cannot be a networked aspect to the control thereof. Respective client computers 110a, 110b, 110c, 110d, 110e, etc. and server computer 10a, 10b, etc. can be equipped with various application program modules or objects 135 and with connections or access to various types of storage elements or objects, across which files or data streams can be stored or to which portion(s) of files or data streams can be downloaded, transmitted or migrated. One or more of computers 10a, 10b, 110a, 110b, etc. can be responsible for the maintenance and updating of a database 20 or other storage element, such as a database or memory 20 for storing data processed according to one or more of the techniques and/or systems described herein. Thus, the features provided for herein can be utilized in a computer network environment having client computers 110a, 110b, etc. that can access and interact with a computer network/bus 14 and server computers 10a, 10b, etc. that can interact with client computers 110a, 110b, etc. and other like devices, and databases 20.

Figure 2:
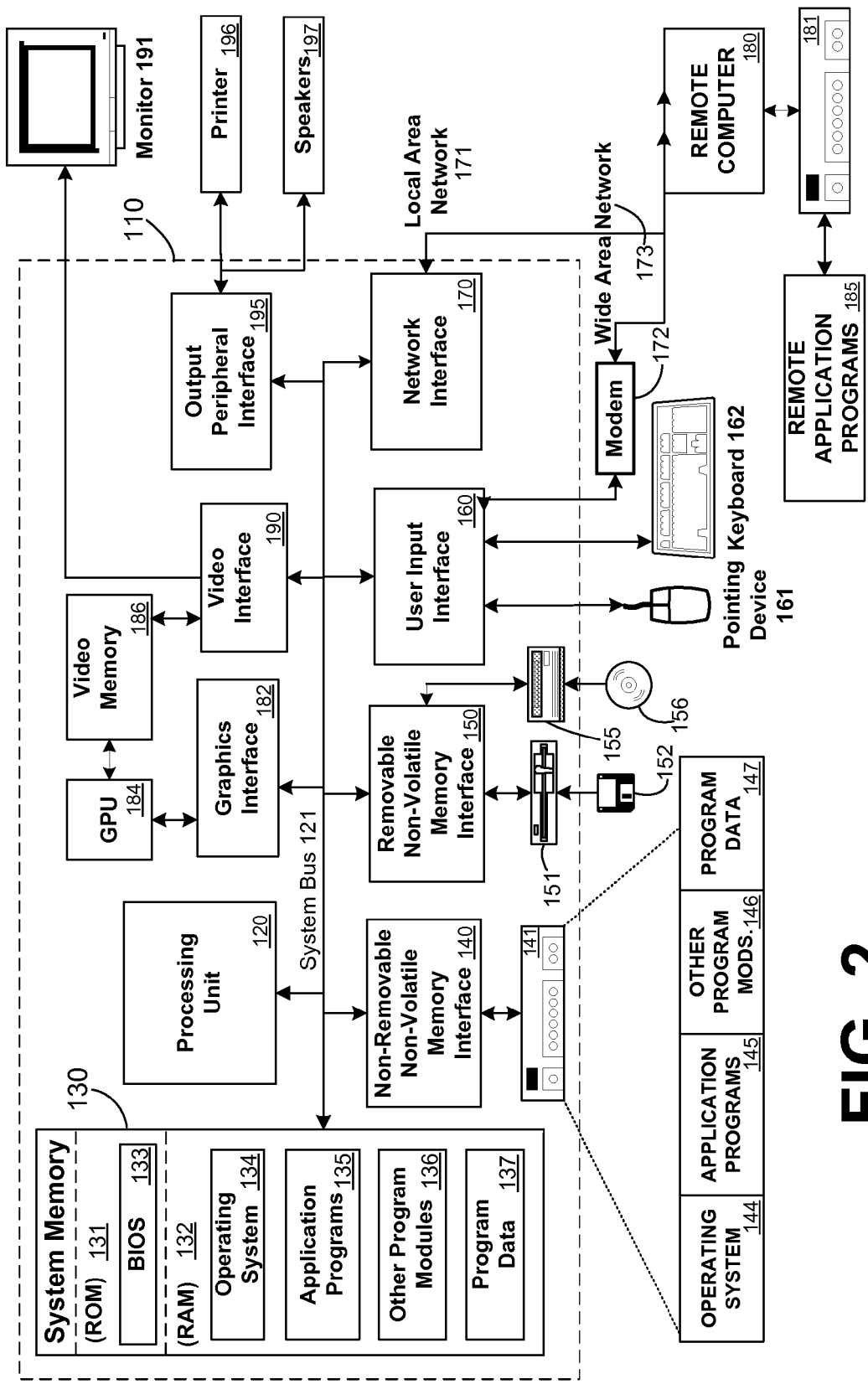
FIG. 2 is a block diagram representing an exemplary non-limiting computing device in which the disclosed subject matter can be implemented.

FIG. 2 and the following discussion are intended to provide a brief general description of a suitable computing environment in connection with which the techniques and/or systems provided for herein can be implemented. It should be understood, however, that handheld, portable and other computing devices and computing objects are contemplated for use in connection with the present disclosure (e.g., anywhere where that a GPU exists in a computing environment). While a general purpose computer is described below, this is but one example, and the systems and/or techniques presented herein can be implemented with a thin client having network/bus interoperability and interaction. Thus, the present features described herein can be implemented in an environment of networked hosted services in which very little or minimal client resources are implicated, e.g., a networked environment in which the client device serves merely as an interface to the network/bus, such as an object placed in an appliance. In essence, anywhere that data can be stored or from which data can be retrieved or transmitted to another computer is a desirable, or suitable, environment for operation of the graphics optimization technique in accordance with the present disclosure.

Although not required, the features described herein can be implemented via an operating system, for use by a developer of services for a device or object, and/or included within application software that operates in connection with the graphics programming techniques for a graphics pipeline. Software can be described in the general context of computer-executable instructions, such as program modules, being executed by one or more computers, such as client workstations, servers or other devices. Generally, program modules comprises routines, programs, objects, components, data structures and the like that perform particular tasks or implement particular abstract data types. Typically, the functionality of the program modules can be combined or distributed as desired in various embodiments. Moreover, those skilled in the art will appreciate that the features described herein can be practiced with other computer system configurations and protocols. Other well known computing systems, environments, and/or configurations that can be suitable for use with the features include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The systems and/or techniques can also be practiced in distributed computing environments where tasks are performed by remote processing devices that are linked through a communications network/bus or other data transmission medium. In a distributed computing environment, program modules can be located in both local and remote computer storage media comprising memory storage devices, and client nodes can in turn behave as server nodes.

FIG. 2 thus illustrates an example of a suitable computing system environment 100 in which the features described herein can be implemented, although as made clear above, the computing system environment 100 is merely one example of a suitable computing environment and is not intended to suggest a limitation as to the scope of use or functionality of the instant disclosure. Neither should the computing environment 100 be interpreted as having a dependency or requirement relating to one or a combination of components illustrated in the exemplary operating environment 100.

With reference to FIG. 2, an exemplary system for implementing the present disclosure includes a general purpose computing device in the form of a computer 110. Components of computer 110 can include, but are not limited to, a processing unit 120, a system memory 130, and a system bus 121 that couples various system components including the system memory to the processing unit 120. The system bus 121 can be one or more of several types of bus structures including a memory bus or memory controller, a peripheral bus, and a local bus using one or more of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be available media that can be accessed by computer 110 and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read merely memory (ROM) 131 and random access memory (RAM) 132. A basic input/output system 133 (BIOS), comprising the basic routines that help to transfer information between elements within computer 110, such as during start-up, is typically stored in ROM 131. RAM 132 typically comprises data and/or program modules that are immediately accessible to and/or presently being operated on by processing unit 120. By way of example, and not limitation, FIG. 2 illustrates operating system 134, application programs 135, other program modules 136, and program data 137.

The computer 110 can also include other removable/non-removable, volatile/nonvolatile computer storage media. By way of example, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user can enter commands and information into the computer 110 through input devices such as a keyboard 162 and pointing device 161, commonly referred to as a mouse, trackball or touch pad. Other input devices (not shown) can include a microphone, joystick, game pad, satellite dish, scanner, or the like. These and other input devices are often connected to the processing unit 120 through a user input interface 160 that is coupled to the system bus 121, but can be connected by other interface and bus structures, such as a parallel port, game port or a universal serial bus (USB). A graphics interface 182, such as Northbridge, can also be connected to the system bus 121. Northbridge is a chipset that communicates with the CPU, or host processing unit 120, and assumes responsibility for accelerated graphics port (AGP) communications. One or more graphics processing units (GPUs) 184 can communicate with graphics interface 182. In this regard, GPUs 184 generally include on-chip memory storage, such as register storage and GPUs 184 communicate with a video memory 186, wherein the application variables of the features described herein can have impact. GPUs 184, however, are but one example of a coprocessor and thus a variety of coprocessing devices can be included in computer 110, and can include a variety of procedural shaders, such as pixel and vertex shaders. A monitor 191 or other type of display device is also connected to the system bus 121 via an interface, such as a video interface 190, which can in turn communicate with video memory 186. In addition to monitor 191, computers can also include other peripheral output devices such as speakers 197 and printer 196, which can be connected through an output peripheral interface 195.

The computer 110 can operate in a networked or distributed environment using logical connections to one or more remote computers, such as a remote computer 180. The remote computer 180 can be a personal computer, a server, a router, a network PC, a peer device or other common network node, and typically includes many or all of the elements described above relative to the computer 110, although merely a memory storage device 181 has been illustrated in FIG. 2. The logical connections depicted in FIG. 2 include a local area network (LAN) 171 and a wide area network (WAN) 173, but can also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which can be internal or external, can be connected to the system bus 121 via the user input interface 160, or other appropriate mechanism. In a networked environment, program modules depicted relative to the computer 110, or portions thereof, can be stored in the remote memory storage device. By way of example, and not limitation, FIG. 2 illustrates remote application programs 185 as residing on memory device 181. It will be appreciated that the network connections shown are exemplary and other means of establishing a communications link between the computers can be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform (e.g., .NET), includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the disclosure can also be implemented via an operating system, application programming interface (API) or a "middle man" object, a control object, hardware, firmware, intermediate language instructions or objects, etc., such that the methods can be included in, supported in or accessed via the languages and services enabled by managed code, such as .NET code, and in other distributed computing frameworks as well.

Figure 3:
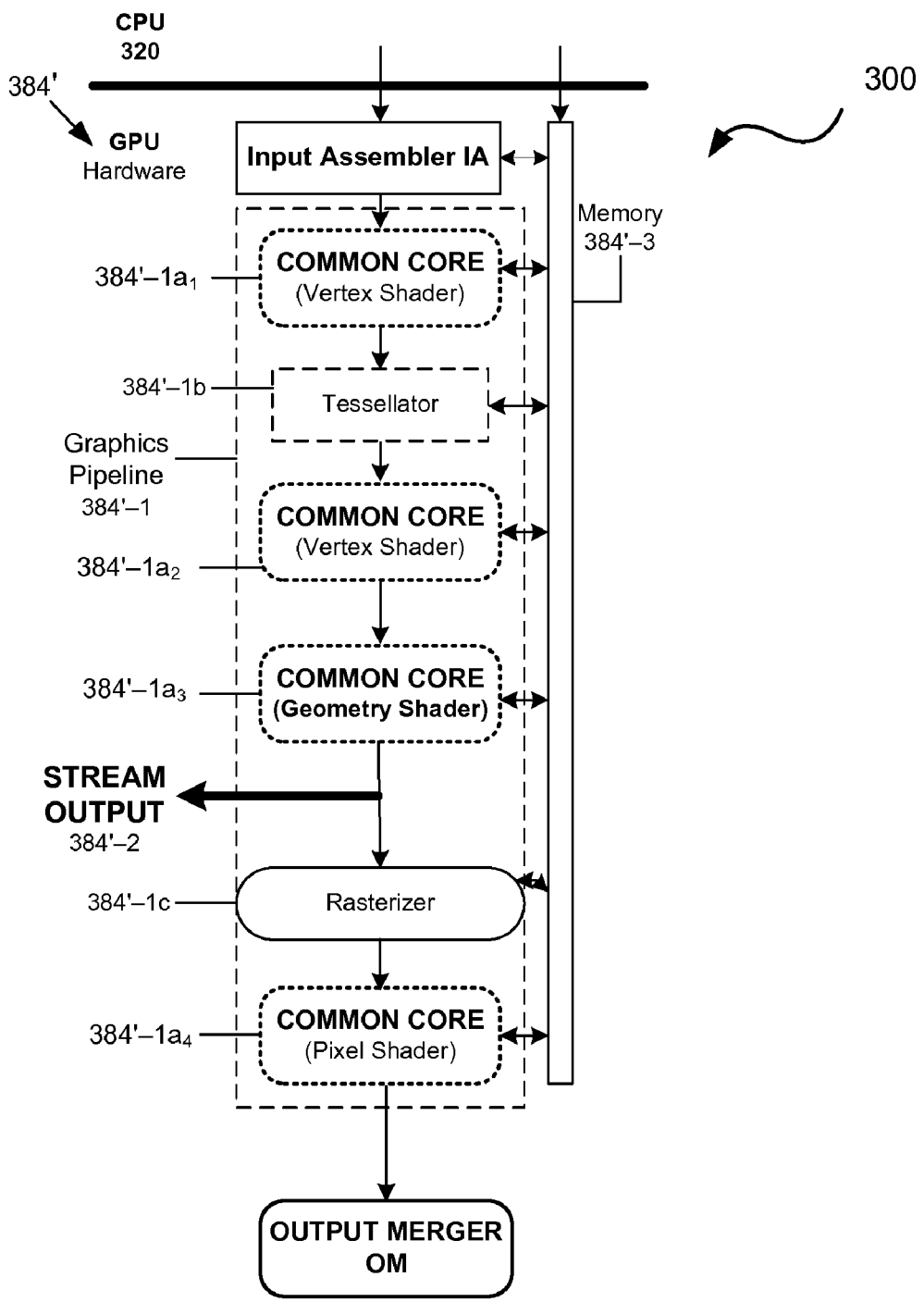
FIG. 3 shows an exemplary graphics system comprising a graphics subunit that comprises a graphics processing unit (GPU) and an exemplary hardware configuration for the associated graphics pipeline.

FIG. 3 shows an exemplary graphics system 300 comprising a graphics subunit, such as a video card, that comprises a graphics processing unit (GPU) 384' and an exemplary hardware configuration for the associated graphics pipeline 384'-1. The exemplary 3D Graphics System 300 can comprise, among other things, a Central Processing Unit (CPU) 320 and a graphics card including a Graphics Processor Unit (GPU) 384' (sometimes referred to Visual Processing Unit (VPU)) comprising a graphics pipeline 384'-1 (sometimes referred to as the "rendering pipeline"). The GPU 384' can be coupled to the CPU 320 and main RAM, for example, through the AGP or PCI Express bus.

The CPU 320 can generally be any processor, such as, a single chip, multi-core processor running multiple cores (e.g., processors), such as a simultaneous multithreading (SMT) processor which can process or execute several (e.g., one or more) threads at the same time. As used herein, the term "thread" refers to an individual sequence of instructions. As such, simultaneous multithreading refers to the ability for a single processor to handle several threads at the same time. Respective cores in the CPU 320 can have a Single Instruction Multiple Data (SIMD) unit as an extension to the processor instruction set. The extension can comprise special instructions that help to speed up integer and floating-point-intensive applications, when specially coded to take advantage of these instruction sets. Calculations involved in rendering 3D graphics can be mathematically-intensive and rather taxing on the CPU 320. To alleviate the burden on the CPU 320, the GPU 384' is provided to help the computer run more efficiently.

Before graphics are output to a raster display device (e.g., a computer monitor 191), the information used to generate those graphics goes through the GPU '384 and its graphics pipeline 384'-1. The GPU 384' implements the graphics pipeline 384'-1 in hardware to perform billions of geometry calculations per second.

The GPU '384 is very efficient at manipulating and displaying graphics, and its highly-parallel structure makes it more effective than typical CPUs for a range of complex algorithms. The GPU '384 implements a number of graphics primitive operations in a way that makes running them much faster than drawing directly to the screen with the host CPU 320. Lifting this burden from the CPU 320 means that the computer's CPU 320 does not have to work as hard to process graphics data (e.g., frees up cycles that can be used for other jobs). By offloading most of the graphics functions to the GPU '384, the CPU can perform even more calculations in order to achieve an immersive, real-time, graphics environment. The GPU '384 is responsible for accelerating the display of graphical elements (e.g., polygons with texture and shading applied to them) on the raster display device (e.g., a computer monitor). The GPU 384' processes raw geometry data to ultimately represent that information as pixels on the monitor 191. The graphics pipeline 384'-1 receives a representation of a 3D scene, efficiently processes that representation by running the representation through a number of processing stages, and renders 3D scenes as 2D raster images at the monitor 191.

The GPU 384' can be implemented as one or more stand-alone microprocessors which are configured to process real-time 2D and 3D graphics. The GPU 384' can sit on a separate graphics card (from the motherboard) for processing for 2D and/or 3D computer graphics and then rendering 2D or 3D images. The GPU 384' can access high-performance VRAM directly on the graphics card. Alternatively, the GPU 384' can be implemented by integrating it into one of the chips on a PC motherboard so that the GPU 384' can use the main memory as a frame buffer and the CPU to aid in frame rendering. The GPU 384' can be used, for example, as a dedicated graphics/video rendering device for a personal computer or game console.

In 3D graphics rendering, the graphics pipeline 384'-1 refers to the various stages of processing (e.g., the sequence of acts) that the GPU 384' carries out to transform three-dimensional image data (e.g., the vertices, textures, and other data) from an application into an actual image that is displayed on a two-dimensional screen. The properties provided per vertex can comprise, for example, x-y-z coordinates, RGB values, translucency, texture, reflectivity and other characteristics.

The different stages in the graphics pipeline 384'-1 are responsible for processing information that is initially provided as properties at the end points (vertices), or control points of the geometric primitives, to generate the image that is eventually rendered. As used herein, the term "primitive" can refer to a collection of vertices that form a single 3D entity. The simplest primitive is a collection of points in a 3D coordinate system, which is called a point list. The typical primitives in 3D graphics are lines and triangles. Other types of primitives can include, for example, a line, line list, line strips, a triangle, triangle lists, triangle strips, and triangle fans. Often, 3D primitives are polygons. A polygon is a closed 3D figure delineated by at least three vertices. The simplest polygon is a triangle. Triangles can be used to compose most polygons because all three vertices in a triangle are guaranteed to be coplanar. Triangles can be used to form large, complex polygons and meshes.

Within the graphics pipeline 384'-1 stages are working in parallel. By reconfiguring the graphics pipeline 384'-1 different visual effects can be achieved. For example, the graphics pipeline might receive the geometry to be displayed (e.g., list of triangles), perform the necessary geometric transformations on it (e.g., rotations, translations etc.), calculate the color for the geometry to be displayed, and then render the geometry to be displayed.

In general, the graphics pipeline 384'-1 can comprise the following logical stages: input assembler (IA), vertex shaders 384'-1$a_1$ and 384'-1$a_2$, a geometry shader 384'-1$a_3$ having an associated stream output 384'-2, the rasterizer 384'-1$c$, a pixel shader 384'-1$a_4$, and the output merger (OM). The graphics pipeline 384'-1 can be configured to optimize the use of resources, balance the workload in the graphics pipeline 384'-1, allow access to calculated information with IEEE compliant integer or floating point values, and/or provide additional programmability, for example.

The exemplary non limiting embodiment of the graphics pipeline 384'-1 employs dynamically configurable common shader core(s) comprising a number of units or processing cores 384'-1$a$ that can be configured in various configurations. The common shader core allows simplified optimization as identical hardware units (for the different shaders) provide load balancing by reconfiguring, or disabling a shader as part of the pipeline when it is not needed, thus freeing up resources for stages that remain active.

These processing cores 384'-1$a$ can be read into memory and write out from memory in various patterns depending upon the particular application being executed. Depending on its configuration, respective units 384'-1$a$ can be used to perform a vertex shader stage, a geometry shader stage and/or a pixel shader stage. This allows the common shader cores to be scheduled to different stages (or functional blocks) of the graphics pipeline 384'-1 on demand to allocate pixel shaders, geometry shaders and vertex shaders in a manner that is best suited for the tasks being requested of the pipeline 384'-1. Any stage can be dynamically enabled or disabled, and configured or reconfigured, thereby freeing and respecializing resources for stages that are active. As such, the underlying resources of the graphics chip can be optimized for the tasks being asked of the graphics chip.

The particular configuration of the graphics pipeline 384'-1 shown in FIG. 3 comprises a plurality of shared programmable cores or common core elements 384'-1$a$, such as vertex shaders 384'-1$a_1$ and 384'-1$a_2$, a geometry shader 384'-1$a_3$ having an associated stream output 384'-2 and a pixel shader 384'-1$a_4$. These different functional stages operate in parallel serving as separate special-purpose processors. Depending upon that particular implementation, there can be additional or fewer pipeline stages that are shown in FIG. 3. Moreover, during the processing of certain vertex and primitive data, merely some of the pipeline stages shown can actually process that data before an output is displayed on a computer monitor.

The graphics pipeline 384'-1 receives incoming primitive data from and vertex data from an application and passes it through the various pipeline stages before an output is displayed on a computer monitor or screen. The input assembler (IA) introduces vertex data, such as, triangles, lines or points into the graphics pipeline 384'-1 by pulling source geometry data out of vertex memory buffers and index memory buffers.

"Non-indexed" or "indexed" rendering can be used to produce addresses from which to fetch vertex data in memory, and subsequently assemble the results into vertices and primitives.

"Non-indexed" rendering refers to the sequential traversal of vertex buffer(s) comprising vertex data, originating at a start offset at respective buffer bindings. Vertex memory buffers (not shown in FIG. 3) can receive untransformed model vertices from an application and store them as vertex data.

The buffers are respectively bound to an individual input slot. The layout of data across the buffers is specified by an input declaration, in which respective entries define an "element" with an input slot, a structure offset, a data type, and a target register (for the first active shader in the pipeline). The vertex memory buffers can comprise any vertex type. Vertex data can come from multiple buffers, accessed in an "Array-of-Structures" fashion from respective buffers. A given sequence of vertices is constructed out of data fetched from buffers. Various primitive topologies are available to make the sequence of vertex data represent a sequence of primitives. Example topologies are, for example, point-list, line-list, triangle-list, triangle-strip.

"Indexed" rendering refers to the sequential traversal of a single buffer comprising scalar integer indices, originating at a start offset into the buffer. The data to be processed by the graphics pipeline 384'-1 can also be assigned an index. Index memory buffers (not shown in FIG. 3) receive raw, indexed geometric primitive data from an application including points, lines, triangles, and polygons. These geometric primitives can be referenced in the vertex data with index memory buffers. Respective indexes indicate where to fetch data out of buffer(s) comprising vertex data. The index memory buffers comprise index data, or indices, which are integer offsets into vertex memory buffers and are used to render primitives using techniques which draw indexed primitives from a current set of data input streams. Because an index buffer comprises indices, an index buffer cannot be used without a corresponding vertex buffer. Indexing can be useful in a number of situations. For instance, an index value can be used, for example, as part of a video memory addressing scheme while processing data (e.g., the index can signify where and when to retrieve (and/or write to) portions of video memory for processing). The programs downloaded to the shader can thus programmatically use the index values associated with the graphics data while retrieving or writing to video memory, and also while processing graphics data.

The input assembler (IA) sends data to the first common core 384'-1$a_1$. In this embodiment, the first common core 384'-1$a_1$ is configured as a vertex shader stage. The vertex shader stage operates on or processes streams of vertices (from video memory of the graphics pipeline) that are specified for algorithmic transformation via a program from the host. Among other things, a vertex shader can receive a variety of inputs such as uniform variables and vertex attributes. Uniform variables are constant values for respective shader invocations. By contrast, vertex attributes are per-vertex data (a special case of variant variables) such as vertex position.

Vertex shaders generally operate on a single input vertex and produce a single output vertex, where a "vertex" refers a point of intersection in 3D space usually defined by its location using x-, y-, and z-coordinates. The vertex shader stage can allow respective geometric vertices to be processed by a short program before it is projected onto the screen. For instance, the vertex shader stage can manipulate an object's position in 3-D space by defining techniques to compute vector space transformations and other linearizable computations. For example, the vertex shader stage can apply computations of positions, colors and texturing coordinates to individual vertices, and can perform operations such as transformations, skinning, and lighting. Some examples of vertex shader's functionalities include arbitrary mesh deformation and vertex displacements in general, computing linearizable attributes for later pixel-shaders such as texture coordinate transformationsm.

The data can then be sent to a tessellator 384'-1$b$, which performs tessellation on the data. It will be appreciated by those skilled in the art that the tessellation act may not occur in some practical implementations. Tesselation generally refers to a process which involves covering of a bounded geometric region without gaps or overlaps by congruent plane figures of one type or a few types. Following the tessellator 384'-1$b$, there is another common core in the pipeline, which can be used to perform post tessellation vertex shading on the data.

The second common core is followed by a third common core that is configured as a geometry shader, 384'-1$a_3$. The geometry shader 384'-1$a_3$ allows for programming primitives as well as the generation of new geometry. The geometry shader 384'-1$a_3$ can operate on different types of "primitive" input including vertices/points, lines (sets of two vertices), and triangles (sets of three lines), and generate new geometry inside the pipeline based on the primitives being input. The geometry shader's inputs are the vertices for a full primitive (two vertices for lines, three vertices for triangles, or single vertex for point) plus the vertex data for the edge-adjacent primitives (an additional two vertices for a line, an additional three for a triangle). For example, the geometry shader 384'-1$a_3$ can receive one primitive and output either zero, one or multiple primitives. The geometry shader 384'-1$a_3$ can output multiple vertices forming a single selected topology. Some examples of the output include topologies like a triangle strip, a line strip or a point list. The number of primitives emitted can vary within invocations of the geometry shader 384'-1$a_3$.

The geometry shader 384'-1$a_3$ can take in one primitive, and output multiple primitives, optionally processing adjacent primitives, such as adjacent vertices. In other words, the geometry shader 384'-1$a_3$ enables operations on the entire primitive not just by itself, but also in the context of some additional nearby vertices. One line segment in a polyline, for example, can be processed with the ability to read the vertices before and after that segment. One application of this capability (e.g., to process adjacent vertices of a primitive) is that the geometry shader 384'-1$a_3$ is configured to take information about neighboring points in 3-D geometric space into account in current calculations.

Algorithms that can be implemented in the geometry shader 384'-1$a_3$ can include: point sprite or wide line tessellation, fur/fin generation, shadow volume generation, single pass rendering to multiple texture cube faces, for example, and set up barycentric coordinates as primitive data (so that the pixel shader can perform custom attribute interpolation).

To perform point sprite tessellation, the shader would take a single vertex and generate four vertices, or two output triangles representing four corners of a quadrilateral, while performing wide line tessellation, the shader receives two line vertices, and generates four vertices for a quadrilateral representing a widened line. Additionally, the geometry shader can utilize adjacent line vertices, to perform mitering on the line end points.

The geometry shader can also be used to generate fur or fins. This is not limited to fur or fin generation, but encompasses other vertices added in a third direction of a single topology. Examples include hair, scales, grass, etc., where primitives describing a geometry are fed to the geometry shader, and the geometry shader grows the geometry arbitrarily to supplement the shape. Thus, with hair, for instance, based on triangles input to a geometry shader, the geometry shader can add a few vertices that represent hair at respective vertices. Advantageously, because a stream of triangles to the geometry shader comprises information about the neighbors of a vertex, the proximity and properties (color, depth, etc.) of the geometry of the vertex's neighbors can be taken into account during processing. Another exemplary non-limiting use of the geometry shader includes shadow volume generation where the adjacency information is used to decide whether to extrude. Furthermore, an application can want to generate some geometry, like a fin or fur and extrude shadow volumes out of that. In such cases, multi-pass functionality of the geometry shader would be employed using the ability output a data stream and circulate it back through the use of the stream output.

In this exemplary non-limiting embodiment, the output from a geometry shader $384'\text{-}1a_3$ goes to either the rasterizer $384'\text{-}1c$ for rendering and/or to a buffer via stream output (SO) $384'\text{-}2$. Turning the stream output (SO) $384'\text{-}2$ "on" does not stop the rasterization functions of the graphics pipeline $384'\text{-}1$; it merely amplifies the power of the graphics pipeline $384'\text{-}1$ by providing more programmatic power to the developer, for example.

The stream output (SO) $384'\text{-}2$ serves like a "tap" in the graphics pipeline $384'\text{-}1$ which can be turned on and off even as data continues to flow down to the rasterizer $384'\text{-}1c$. The stream output (SO) $384'\text{-}2$ can be tapped into anywhere inside the graphics pipeline $384'\text{-}1$ prior to the data reaching the frame buffer for rasterization.

When the stream output (SO) $384'\text{-}2$ is off, the stream output (SO) $384'\text{-}2$ may have no effect on the pipeline. In other words, the stream output (SO) may be optional; an application can merely allow the pipeline to send the data through without reading the data to a stream output buffer. Furthermore, the stream output buffer is one example of the type of memory that can be used to store the streamed data. There can be times when different types of memory can be used for such functionality, like cache memory in a microprocessor.

When turned on, the stream output (SO) $384'\text{-}2$ allows programmers to "tap" into the pipeline while the data is inside the pipeline, and provide that data to another location.

For instance, the stream output (SO) $384'\text{-}2$ can stream primitives to one or more output buffers for re-use elsewhere in the pipeline, enabling the application of recursive programmatic algorithms inside the pipeline. Data sent out via stream output (SO) $384'\text{-}2$ can be concatenated to buffer(s). The data in the buffer(s) can then be recirculated to graphics pipeline $384'\text{-}1$ inputs on subsequent passes. For example, the data received at the stream output (SO) $384'\text{-}2$ can be written to a buffer or memory for retrieval by the host or other operation.

Alternatively, the data received at the stream output (SO) $384'\text{-}2$ can be recirculated (e.g., fed back or fed forward) to another entity within the pipeline, such as, the input assembler (IA), vertex shaders $384'\text{-}1a_1$ and $384'\text{-}1a_2$, geometry shader $384'\text{-}1a_3$, or the pixel shader $384'\text{-}1a_4$ to perform recursive or looping functionality. The stream output (SO) $384'\text{-}2$ can allow data to be recirculated to other parts of the graphics pipeline $384'\text{-}1$ programmatically (e.g., the programmer can download a program to the GPU which performs recursive operations on the data (recirculating data through the same algorithms recursively) or otherwise loop through the data a pre-fixed number of times). For instance, the stream output (SO) $384'\text{-}2$ can be used to recirculate the data to the shader itself thereby allowing multi-pass operations to be performed on the given data. This can enable programmatic recursive and looping algorithms on graphics data, for example. Another way to recirculate data is to send it through the pipeline again inputting the data to the input assembler (IA) again, for example.

Furthermore, if necessary, the information can be streamed out while the same data goes to the rasterizer, thus not slowing down the rendering of data, or enabling the display of the image as it undergoes a transformation based on recursive algorithmic elements operating on the data, for example.

The next component of the graphics pipeline $384'\text{-}1$ is a rasterizer $384'\text{-}1c$. The rasterizer $384'\text{-}1c$ is not necessarily a stage in the graphics pipeline $384'\text{-}1$, but rather an interface between various pipeline $384'\text{-}1$ stages. The rasterizer $384'\text{-}1c$ assumes input positions are provided in clip-space and performs a significant set of fixed function operations which can include clipping, perspective divides, viewport or scissor selection, primitive setup, and determining how to invoke pixel shader $384'\text{-}1a_4$. Many of these functions can be adjusted by software developers.

Following the rasterizer is a fourth common core, $384'\text{-}1a_4$, and it functions as a pixel shader where it takes one pixel and outputs the pixel at a position. A pixel shader can allow respective pixels to be processed by a short program that can comprise, for example, image textures (or texture data) as inputs. A pixel shader can allow developers to manipulate colors, textures or even shapes by altering the lighting, color and surface at a pixel level. Pixel shaders can be used to alter the lighting, color and surface of respective pixels. This, in turn, affects the overall color, texture and shape of 3-D objects built from these pixels.

Input data available to the pixel shader $384'\text{-}1a_4$ comprises vertex attributes that can be chosen, on a per-element basis, to be interpolated with or without perspective correction, or be treated as constant per-primitive. Outputs generated by the pixel shader $384'\text{-}1a_4$ can be one or more 4-vectors of output data for the current pixel location, or no color (if pixel is discarded). A partial list of effects that pixel shaders make possible comprises: per-pixel reflections, per-pixel lighting using Phong-style shading or DOT3 effects, and procedural textures, for example.

At the output merger (OM), the final act in the logical graphics pipeline $384'\text{-}1$, other pixel processing functions can be performed to render the final pixels. These functions can include, for example, binding of output resources (render targets), modifying pixel color values with a scissor test, visibility determination, through depth bias and/or stencil buffer techniques, or applying functions such as alpha blending or fog, shadowing, bump mapping, environment mapping, antialiasing, writing or blending of output(s) to render target(s), which can be one of many resource types, and/or multiple-element textures. After performing these functions on the data, the data can be processed further and eventually displayed on a monitor, 191.

Figure 4:
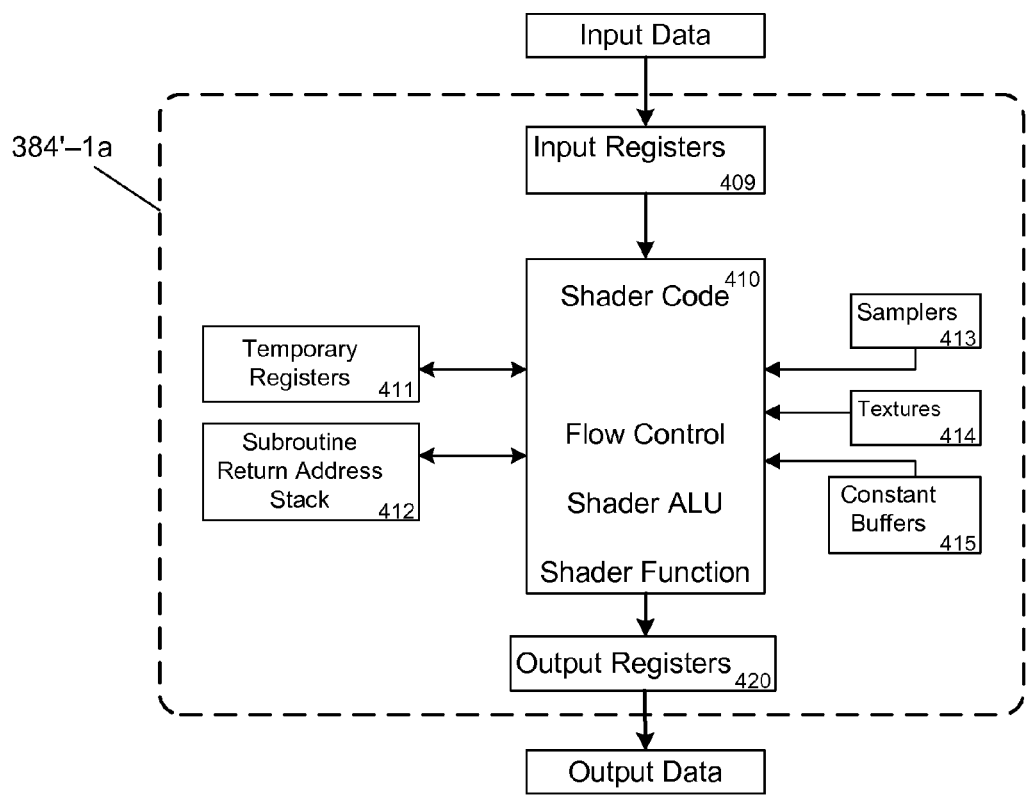
FIG. 4 is a block diagram representing an exemplary, non-limiting embodiment of the hardware and software components of a common shader core.

FIG. 4 is a block diagram representing an exemplary, non-limiting embodiment of the hardware and software components of a common shader core $384'\text{-}1a$. The common shader core $384'\text{-}1a$ can be used, for example, to implement either the vertex shaders $384'\text{-}1a_i$ and $384'\text{-}1a_2$, the geometry shader $384'\text{-}1a_3$, or the pixel shader $384'\text{-}1a_4$, shown above in FIG. 3, for example.

The common shader core $384'\text{-}1a$ receives the input data from either the input assembler (IA) unit, a previous stage which can be from anywhere in the graphics pipeline $384'\text{-}1$, and/or in some cases, from a specialized input source.

The input data can then be (temporarily) stored in input register(s) 409. The input register(s) 409 can be, for example, a dynamically indexable array. In the case of a geometry shader, the input register(s) can be a two dimensional (2D) array which arranges the inputs, for example, as [vertex][element] pairs.

The input data is then sent to the shader code 410. The shader code 410 provides flow control mechanisms, an arithmetic logic unit (ALU) that handles vector floating point and integer arithmetic, memory fetch or sample operations, and a shader function or program that specifies the particular transformations to be performed on the input data. The shader code 410 can also receive a number of other inputs or resources, such as, information from the samplers 413, the textures 414, and/or the constant buffers 415. The shader code 410 can also have two way communication with the temporary registers 411 and the subroutine return address stack 412, for example.

The shader code 410 receives samples from the samplers 413 that define how to sample textures. However, memory can also be read without filtering and the sampler is not necessary in every embodiment. Because sampler objects are statically created, it enables the hardware to maintain references of multiple samplers in the flight of the pipeline without having to track changes or flush the pipeline (because the sampler objects maintain their definitions and are not modified), for example.

The shader code 410 receives texture information from the textures 414. The textures 414 work with the shader code to provide texture sampling.

The CPU generates shader constants that can be used to reconfigure a particular shader program. The shader code 410 receives shader constants from the constant buffers 415. Constant buffers 415 are provided to aggregate or group certain variables (or "shader constants") in memory on the GPU. In other words, instead of using an array of constant registers (c0 ... cN) to store constant input values, constant buffers 415 can be used to group numeric shader constant values together. The constant buffers are improved (e.g., optimized) for lower latency access and more frequent updates than textures 414. The constant buffers 415 can allow a developer to set a particular group of constants at the same time. The constants can be arranged in any particular order that the developer desires. Grouping shader constants together in a constant buffer can result in certain performance benefits. For example, if two shader constants are typically modified and used together at the same time (e.g., have the same state in respective scenarios), then those shader constants can be put into a particular constant buffer.

A particular shader program can require a certain number of constant buffers that are bound to specific slots. In one implementation, for respective stages in the graphics pipeline, there are 15 slots for constant buffers that can be active. In shader code, a cb# register is a placeholder for a constant buffer at "slot" #. A constant buffer is accessed in a shader using: cb#[index] as an operand to shader instructions, where 'index' can be either a non-indexable (r#) or statically indexed (x#) comprising a 32-bit unsigned integer, an immediate 32-bit unsigned integer constant, or a combination of the two added together (e.g., "mov r0, cb3[x3[0].x+6]" represents moving Element 7 from the ConstantBuffer assigned to slot 3 into r0, assuming x3[0].x comprises 1). Applications are able to write shader code that reads constants in whatever pattern and quantity desired, while still allowing different hardware to easily achieve the best performance possible.

The temporary registers 411 serve as temporary storage. In an exemplary, non limiting embodiment, the temporary registers 411 can hold any non-indexable or indexable arrays of any size and quantity that are needed up to the limit of the temporary storage.

The subroutine return address stack 412, in this particular, non limiting exemplary embodiment, is a fixed height. Furthermore, the stack is hidden from direct shader access and transparently stores return addresses, for example. It also permits the definition of recursive algorithms.

After the code has passed through the shader code 410, the data goes to output registers 520. The output registers 520, in this exemplary non limiting embodiment, are made of a dynamically indexable array of four vector outputs. Furthermore, some stages can have additional specialized outputs.

Depending on which stage the common shader core 384'-1a is being implemented at in the graphics pipeline 384'-1, the output data can then be output to: the next shader stage, if present; as a stream output (SO) to memory or other location; or to an output merger (OM) or rendering stage.

The data structures listed can be changed from a 1D array to a 2D array or a list. Data structures can change depending on the size and storing capabilities of the GPU. Within the GPU, changes to the storage limits and fixed heights can occur due to dynamic allocation, and application of compression algorithms to information to conserve space. The samplers and constant buffers can behave like the textures, however as resources change, the definitions of these components can be modified. If textures are redefined, both samplers and constant buffers can change and are not limited to just the texture functions. Furthermore, the data structures can implement new optimization algorithms for speed and utility purposes. The various embodiments described herein are mere examples of graphics pipeline using common cores, which can be dynamically configured to provide functionality of a vertex shader, a pixel shader and a geometry shader.

As noted above, different combinations of state can enable various visual effects. A state management system in the pipeline tracks device state, and abstracts device state into high-level "effects" which are composed of multiple elements with complex interdependencies. Effects are defined as a series of "techniques," techniques depend on "passes," passes depend on state objects and shaders, and state objects and shaders depend on constant buffers and textures. Effects require certain shader programs to be executing on specific constant sets with specific textures as input, bound at specific input slots (also referred to as bind-points) in the pipeline. The state management system can utilize a "dependency tree" to keep track of the relationships or dependencies between various types of different shader resources. Respective resources (e.g., a constant buffer, texture, sampler) can be bound to a slot of the parent object in the dependency tree. In this context a "slot" refers to a slot in the dependency tree for a particular shader. Respective shaders may have different dependencies and thus separate trees with independent slots.

Figure 5A:
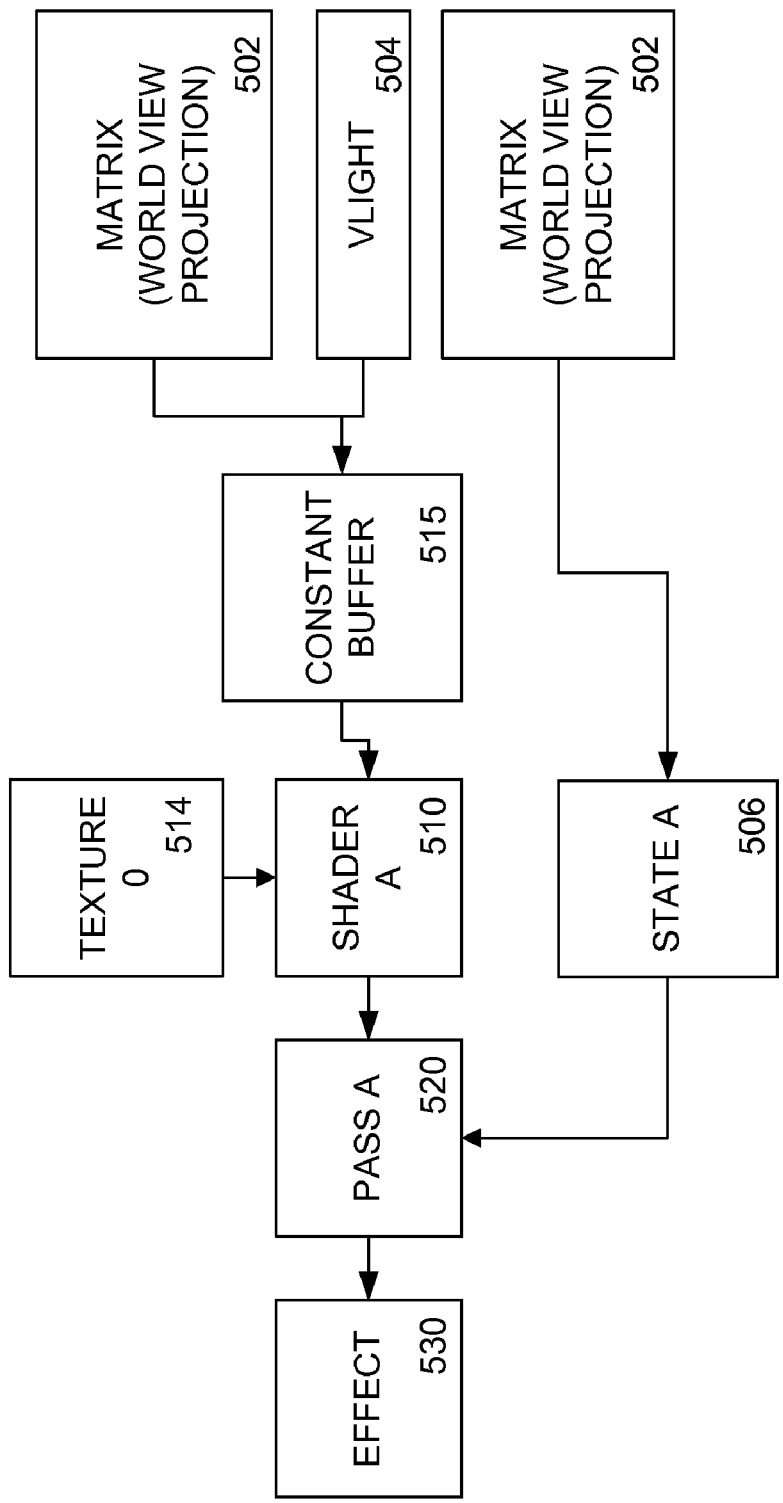
FIG. 5A illustrates an exemplary non-limiting block diagram of a dependency tree.

FIG. 5A illustrates an exemplary non-limiting block diagram of a dependency tree corresponding to one effects file 530. FIG. 5A illustrates the concept of an effect 530 and dependency of the effect 530 on a pass 520, state object 506, a shader 510, a texture 514 and a constant buffer 515. The constant buffer 515 receives a number of shader constants 502, 504. World View projection matrix 502 is a shader constant which defines four constants in a matrix that are used to transform from world space to screen space. This is done once per object. Thus, if there are 50 objects in a screen, that matrix would be set 50 times per scene. V-light 504 is a light vector which specifies the direction light is coming from. For example, V-light 504 might be used to specify the direction of the sun, and would be constant for the entire frame. The shader 510 has a number of resources associated with it. In this particular example, the resources can include the constant buffer 515 and texture 0 514. These resources are "consumed by" the shader 510. Although not shown in FIG. 5A, in addition to shader A 510, there would be a number of other shader programs (e.g., Shader B, Shader C, Shader D, etc.) that are running in parallel. Respective shader programs may have a similar set of dependencies. Pass 520 comprises the output of these different shaders and state A 506. The effects file 530 comprises pass 520, for example.

Referring again to FIG. 4, the common shader core 384'-1a also has a number of input slots (not shown). The resources (individual constants, constant buffers, textures and samplers, etc.) used by shader 384'-1a can be bound to specific input slots of the shader 384'-1a. In one particular implementation, a shader might have, for example, 128 input resource slots associated with it, 16 different constant buffer slots associated with it, and 16 sampler slots associated with it. For example, a particular shader might fill the slots with 16 different constant buffers, 16 different textures, and 16 different samplers. The order in which particular resources are assigned or bound to particular slots of respective shaders does not necessarily need to follow a particular pattern, and can be determined by the compiler. The shader program will do something different with respective resources. For instance, a shader program could accept an input constant buffer 2, another input sampler 0, and another input texture 5, etc. and then generate a particular output depending on those inputs.

Figure 5B:
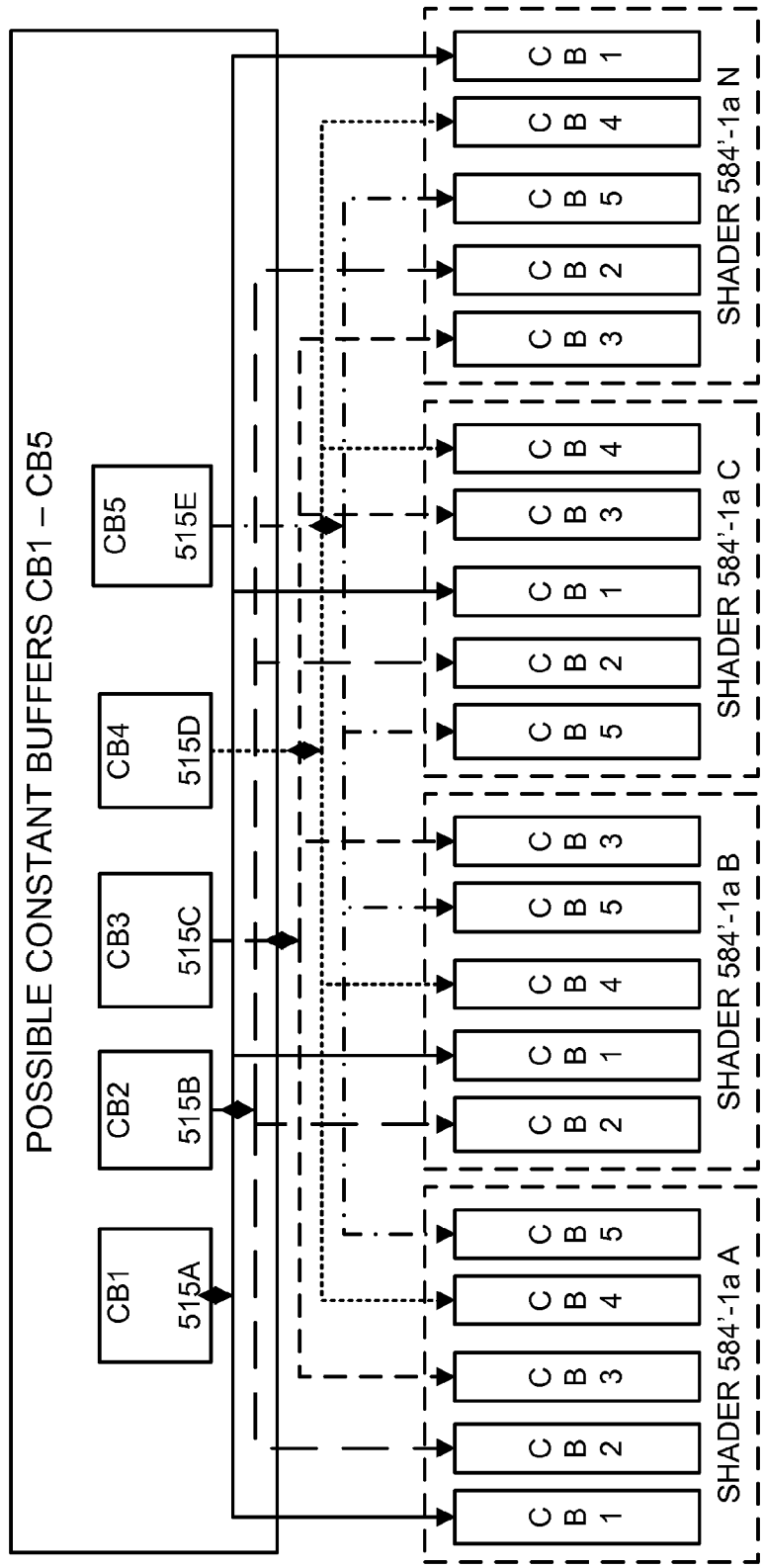
FIG. 5B is an exemplary non-limiting block diagram showing allocation of a number of constant buffers to a number of different shader programs in an exemplary non limiting graphics pipeline.

FIG. 5B is an exemplary non-limiting block diagram showing allocation of a number of constant buffers 515A-515E to a number of different shader programs 584'-1a A-N in an exemplary non limiting graphics pipeline. Respective shader programs 584'-1a A-N have a number of constant buffers (CB1 515A . . . CB5 515E) allocated in different orders at different input slots. For example, shader 584'-1a A might place CB1 at slot 1, CB2 at slot 2, CB3 at slot 3, CB4 at slot 4, and CB5 at slot 5; shader 584'-1a B might place CB2 at slot 1, CB1 at slot 2, CB4 at slot 3, CB5 at slot 4, and CB3 at slot 5; shader 584'-1a C might place CB5 at slot 1, CB2 at slot 2, CB1 at slot 3, CB3 at slot 4, and CB4 at slot 5; and shader 584'-1a N might place a CB3 at slot 1, CB2 at slot 2, CB5 at slot 3, CB4 at slot 4, and CB1 at slot 5.

For simplicity of illustration, the example provided in FIGS. 5B shows four (4) shader programs 584'-1a A-N, and five (5) possible constant buffers (CB1 515A . . . CB5 515E) associated with respective shaders 584'-1a A-N. However, it will be appreciated that in other implementations of a pipeline, there can be many more shaders in the pipeline, and that respective shaders 584'-1a A-N will typically have a larger number (e.g., sixteen or more) of constant buffers than shown in FIG. 5. For example, depending on the complexity of a particular application, there can be hundreds of different shaders, and application developers can specify a virtually unlimited number of constant buffers. In one practical implementation, up to 16 of these constant buffers can be bound at different slots of respective shaders at any given time. Importantly, the order in which particular constant buffers are assigned or bound to particular slots at respective shaders 584'-1a does not necessarily need to follow a particular pattern and can be determined by the compiler.

When two shader programs are compiled independently, the order in which resources are bound to particular slots can be different. For instance, when shader 584'-1a A is executed constant buffers CB1-CB5 are set to slots 1-5 to render shader 584'-1a A. However, when it is time for shader 584'-1a B to be executed, the same constant buffers CB1-CB5 can be bound or reassigned to different slots to execute shader 584'-1a B. For example, when shader 584'-1a A executes, CB1 is bound to slot 1, CB2 is bound to slot 2, CB3 is bound to slot 3, CB4 is bound to slot 4, and CB5 is bound to slot 5, but when the next shader 584'-1a B executes, the same five constant buffers can also be used again, but this time at different slots (e.g., CB2 at slot 1, CB1 at slot 2, CB4 at slot 3, CB5 at slot 4, and CB3 at slot 5). In such cases, the constant buffers have to be unbound from one slot and rebound to a new slot during the transition between executing shader 584'-1a A and shader 584'-1a B. As such, the same five constant buffer need to be re-bound in different orders. There is a performance cost every time the bindings need to be readjusted since a call must be made to the driver to set up the video card, etc. There is no automatic mechanism to mitigate this "disagreement" between shaders, thus resulting in unnecessary reconfiguration of the pipeline as transitions occur between shaders, and binding cycles are wasted.

It would be desirable to reduce and/or minimize the amount of reconfiguration that is needed in the graphics card when switching between shaders (e.g., reduce and/or minimize state changes which would typically occur in re-binding slots). For example, it would be desirable to provide a way to avoid or reduce the need to reassign particular resources to different slots. By placing the resources in the same slots consistently less binding cycles are wasted and/or binding cycles are saved.

Techniques are provided for (optimally) binding resources (e.g., constant buffers, textures and samplers) to certain slots to reduce/minimize the amount of binding reconfiguration that is needed in the graphics card when switching between shaders (e.g., reduce and/or minimize state changes which would typically occur in re-binding slots). According to these techniques, common dependencies between respective shader programs can be determined, and particular resources can be bound to particular slots based on this determination. A dependency tree keeps track of the relationships or dependencies between different shader resources. Respective resources are bound to a slot of a parent object in the dependency tree. These disclosed techniques involve scanning dependencies and reconfiguring the dependency tree so that shaders can change their expectation for where resources are bound. As a result, the number of slots that would need to be rebound in order to transition between currently loaded shaders can be reduced and/or minimized.

According to one embodiment of these techniques, respective dependencies in the dependency tree is scanned, and a cost associated can be computed for respective, different reconfigurations (remappings or rebuilding of shaders) of the dependency tree. Respective reconfigurations of the dependency tree change the particular slots certain resources are bound to. Using these costs, the particular reconfiguration of the dependency tree can then be selected that reduces or minimizes the amount of device reconfiguration to transition between higher-level states. In other words, the particular reconfiguration of the dependency tree which minimizes, for example, the number of slots that would need to be re-bound in order to transition/switch between currently loaded shaders can then be selected. In one implementation, these techniques can be performed for offline content generation and storage (e.g., if the shader set is known ahead of time, shaders are analyzed, dependencies are remapped, and then the shaders are saved back to disk). In an alternative implementation, the method is performed dynamically at application run time/load time (e.g., if the shader set is not known ahead of time).

Accordingly, the particular shader programs are modified to expect certain resources in the same order. This can allow, for example, for optimization of the way constant buffers are associated with particular slots. This reduces the amount of work that needs to be done by reducing the amount of reorganization that occurs when switching between different shaders, for example.

Figure 6:
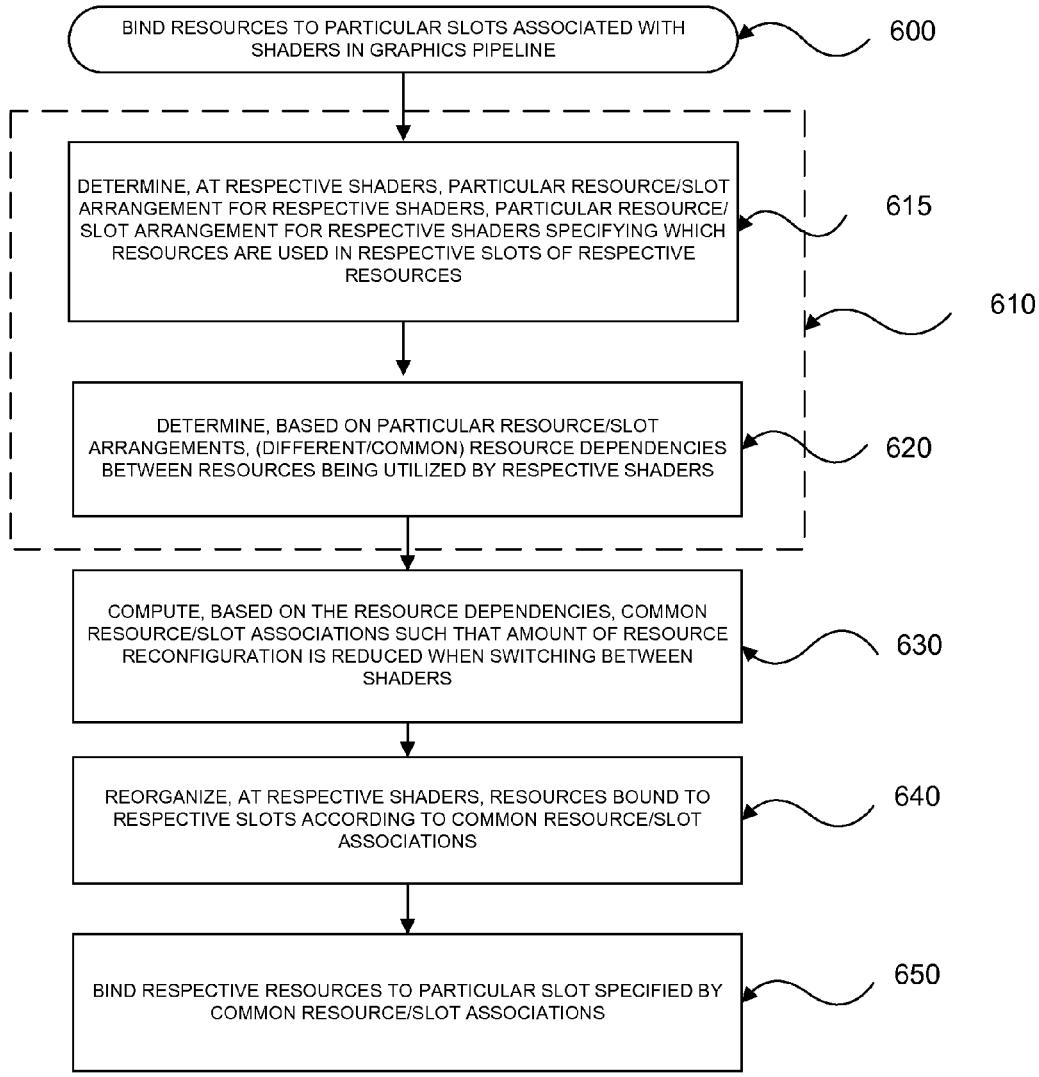
FIG. 6 illustrates an exemplary non-limiting flow diagram for optimally binding resources to particular slots associated with shaders in a graphics pipeline.

FIG. 6 illustrates an exemplary non-limiting flow diagram 600 for (optimally) binding resources to particular slots associated with shaders in a graphics pipeline. During execution of a particular application, a shader can require a certain number of resources (e.g., constant buffers, textures and samplers, etc.) to be bound to specific slots of the shader, for example.

At act 610, resource dependencies between resources being utilized by respective shaders can be determined. In one embodiment, act 610 can involve two sub-act 615, 620. At sub-act 615, a particular resource/slot arrangement for respective shaders can be determined. The particular resource/slot arrangement for respective shaders specify which resources are used in respective slots of respective shaders. At sub-act 620, based on the particular resource/slot arrangements, resource dependencies (e.g., different/common) between resources being utilized by respective shaders can be determined.

At act 630, based on the resource dependencies, common resource/slot associations can be computed. Respective common resource/slot associations identify a particular one of the resources to be associated with a particular one of the slots such that a number of transitions/state changes/amount of reconfiguration of resources is reduced/minimized when switching between shaders. At act 640, at respective shaders, the resources bound to respective slots can then be reorganized according to the common resource/slot associations. At this point, respective shaders have the same common resource/slot associations such that, at respective shaders, the same particular resource is associated with the same particular one of the slots. At act 650, respective resources can be bound to the particular slot as specified by the common resource/slot associations.

Figure 7:
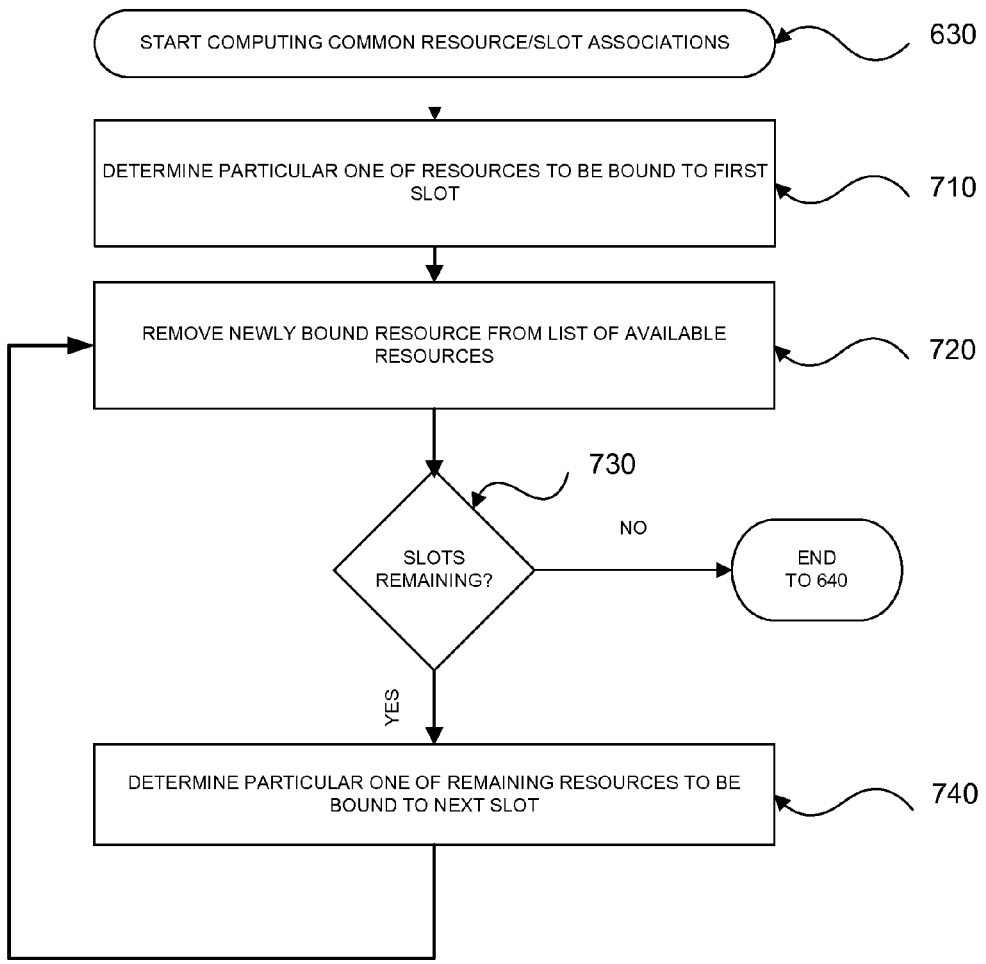
FIG. 7 illustrates an exemplary non-limiting flow diagram for computing common resource/slot associations.

FIG. 7 illustrates an exemplary non-limiting flow diagram 630 for computing common resource/slot associations. At act 710, a particular one of the resources to be bound to a first slot can be determined. After determining the resource that is to be bound to a first slot, at act 720, this resource bound to the first slot can be removed from pool or list or available resources. At act 730, the process can determine whether the slots to be bound for respective shaders have been filled. If there are slots remaining to be bound (e.g., slots that do not yet have a resource bound to them), then at act 740, one of the remaining resources can be determined that is to be bound to a second slot. Acts 720-740 are repeated until a predetermined number of slots to be bound have a particular resource associated therewith. In one embodiment, the algorithm can be applied until a particular cost metric is satisfied. For example, the cost metric can be that the algorithm will stop when there are fewer than, for example, 60 percent resource changes or differences between the shaders. Once the slots to be bound have a resource/slot binding, for example, the process may continue at act 640 of FIG. 6.

Figure 8:
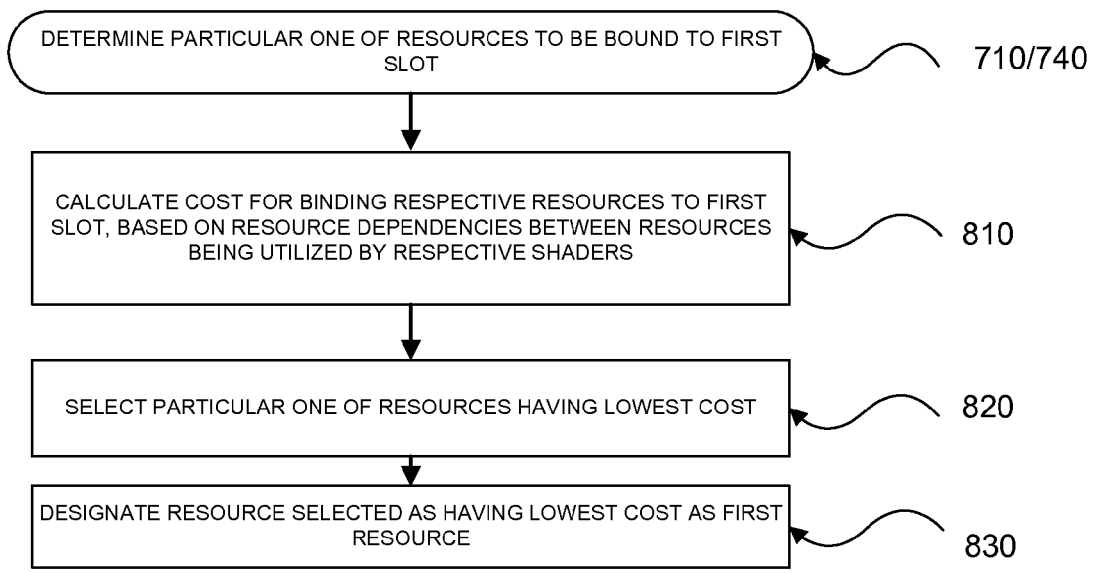
FIG. 8 illustrates an exemplary non-limiting flow diagram for determining a resource/slot bindings.

FIG. 8 illustrates an exemplary non-limiting flow diagram 710/740 for determining specific resource/slot bindings. To determine a first resource to be bound to a first slot, at act 810, a cost for binding respective resources in the dependency tree to the first slot can be calculated based on the resource dependencies between resources being utilized by respective shaders. At act 820, the particular one of the resources having a lower cost (e.g., the lowest cost) can be selected for binding to the first slot, and at act 830, this resource (e.g., selected as having the lowest cost) can be designated as the first resource. Because acts 810 through 830 are embedded within act 740 of FIG. 7, it will be appreciated that acts 810-830 will be repeated until respective slots to be bound have a particular resource/slot binding.

Figure 9:
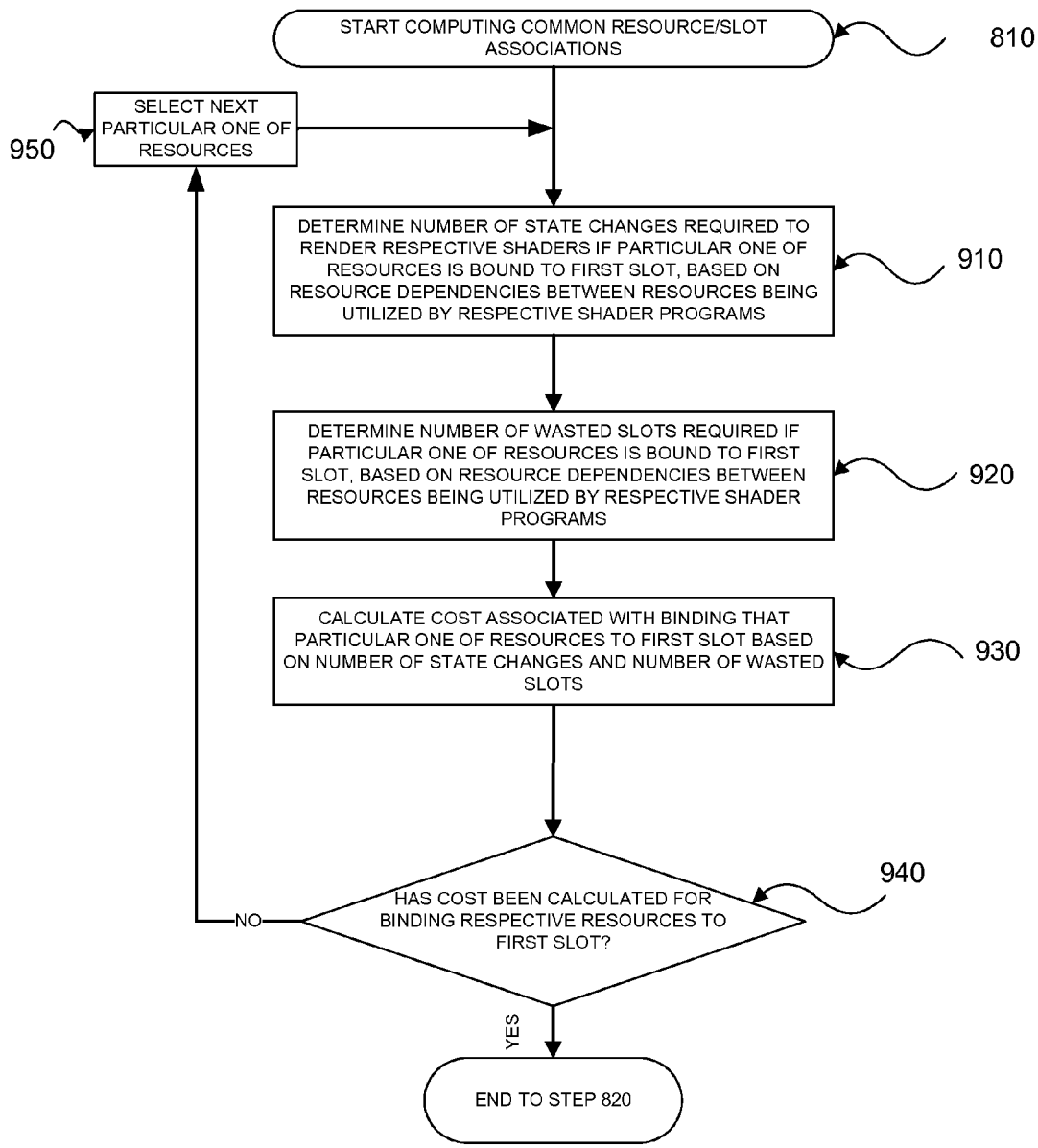
FIG. 9 illustrates an exemplary non-limiting flow diagram for calculating a cost for binding respective resources to a first slot.

FIG. 9 illustrates an exemplary non-limiting flow diagram 810 for calculating a cost for binding respective resources to the first slot. At act 910, a number of state changes required to render respective shaders can be determined if a particular one of the resources is bound to the first slot. This determination can be made by using the resource dependencies between resources being utilized by respective shader programs. At act 920, a number of wasted slots required to render respective shaders if the particular one of the resources is bound to the first slot, can be determined. As above, this determination can be made by using the resource dependencies between resources being utilized by respective shader programs. Using the number of state changes and the number of wasted slots, at act 930, a first cost can be calculated. This first cost is a cost associated with binding that particular one of the resources to the first slot.

This calculation can be repeated for respective resources (e.g., cost associated with binding respective resources to the first slot). At act 940, it can be determined if a cost has been calculated for binding respective resources to the first slot. If not, then the process may proceed to act 950 where the next particular one of the resources in a resource list or dependency tree is selected. Acts 910-930 can then be repeated for the next resource (e.g., cost associated with binding the next resource to the first slot). The process 810 can be repeated until it is determined at act 940 that the cost has been calculated for binding respective resources to the first slot. At this point the process ends and/or returns to act 820. Because acts 910 through 950 are embedded within act 810 of FIG. 8, it will be appreciated that acts 910-950 may be repeated until a cost for binding respective resources to respective slots to be bound has been determined.

Thus, in the example shown in FIG. 5B, the techniques described above could be used to remap the layout of constant buffers used in shader 584'-1a B. For instance, dependencies could be scanned, and if it is determined that the optimal constant buffer layout is that shown in shader 584'-1a A, then at shader 584'-1a B, CBs 2 and 3 could be remapped to be bound to slots 2 and 3, while CB 1 could be remapped to slot 1 and CBs 4 and 5 could be remapped to slots 4 and 5, respectively. This way the switch between shaders 584'-1a A and 584'-1a B requires no additional work beyond the initial binding of CBs to slots shown in shader 584'-1a A, for example. Similar remapping could also take place at shaders 584'-1a C and shader 584'-1a N. As such, the number of slots that would need to be rebound in order to switch between currently loaded shaders would be reduced (e.g., minimized).

There are multiple ways of implementing the features described herein (e.g., an appropriate API, tool kit, driver code, operating system, control, standalone or downloadable software object, etc.) that would enable applications and services to use the systems and methods of the graphics pipeline. The disclosure contemplates the use of the features provided for herein from the standpoint of an API (or other software object), as well as from a software or hardware object that receives any of the aforementioned techniques, including techniques of the common core, the geometry shader or the stream output in accordance with the instant disclosure. Thus, various implementations of the systems and/or techniques described herein can have aspects that are wholly in hardware, partly in hardware and partly in software, as well as in software.

As mentioned above, while exemplary embodiments have been described in connection with various computing devices and network architectures, the underlying concepts can be applied to a computing device or system in which it is desirable to employ a GPU with an enhanced graphics pipeline. For instance, the algorithm(s) and hardware implementations described herein can be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the features described herein.

As mentioned, the various techniques described herein can be implemented in connection with hardware or software or, where appropriate, with a combination of both. Thus, the methods and apparatus of the present disclosure, or certain aspects or portions thereof, can take the form of program code (e.g., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the features described herein. In the case of program code execution on programmable computers, the computing device generally includes a processor, a storage medium readable by the processor (including volatile and non-volatile memory and/or storage elements), at least one input device, and at least one output device. One or more programs that can implement or utilize the enhanced graphics pipeline techniques of the present disclosure (e.g., through the use of a data processing API, reusable controls, or the like) are preferably implemented in a high level procedural or object oriented programming language to communicate with a computer system. However, the program(s) can be implemented in assembly or machine language, if desired. In any case, the language can be a compiled or interpreted language, and combined with hardware implementations.

The methods and apparatus of the present disclosure can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the techniques described herein. When implemented on a general-purpose processor, the program code combines with the processor to provide a unique apparatus that operates to invoke the functionality of the present disclosure. Additionally, any storage techniques used in connection with the systems and/or techniques described herein can invariably be a combination of hardware and software.

While the features have been described in connection with the preferred embodiments of the various figures, it is to be understood that other similar embodiments can be used or modifications and additions can be made to the described embodiment for performing the same function without deviating therefrom. For example, while exemplary network environments are described in the context of a networked environment, such as a peer to peer networked environment, one skilled in the art will recognize that systems and/or techniques described herein are not limited thereto, and that the methods, can apply to any computing device or environment, such as a gaming console, handheld computer, portable computer, etc., whether wired or wireless, and can be applied to a number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the features described herein in the context of a graphics pipeline, the disclosure is not so limited, but rather can be implemented to provide a second processing unit. For instance, if the programmer wants to render a display to the screen and process the computational mathematics while performing another function using the CPU, the processing units can need to be utilized to their fullest, whether or not the graphical display is included in the final output. Still further, the techniques and/or systems described herein can be implemented in or across a plurality of processing chips or devices, and storage can similarly be effected across a plurality of devices. Therefore, the present disclosure should not be limited to any single embodiment, but rather should be construed in breadth and scope in accordance with the appended claims.

What is claimed:

1. A method for assigning resources used by a plurality of shaders of a graphics pipeline, comprising:

identifying a hierarchical tree comprising a plurality of nodes, respective nodes in the hierarchical tree identifying a shader and an association of the shader to one or more of the resources;

determining a first cost metric for a first arrangement of associations of the plurality of shaders to resources in the hierarchical tree, the first arrangement specifying that a first resource is associated with a first shader;

determining a second cost metric for a second arrangement of associations of the plurality of shaders to resources in the hierarchical tree, the second arrangement specifying that the first resource is associated with a second shader, the second shader different than the first shader; and binding the first resource to the second shader when the second cost metric is less than the first cost metric, at least some of at least one of identifying the hierarchical tree, determining the first cost metric, determining the second cost metric, and binding the first resource to the second shader when the second cost metric is less than the first cost metric implemented at least in part via a processor.

2. The method of claim 1, the first and second cost metrics indicative of a number of rebindings necessary to transition between currently loaded shaders.

3. The method of claim 1, comprising determining a third cost metric for a third arrangement of associations of the plurality of shaders to resources in the hierarchical tree, the third arrangement specifying that the first resource is associated with a different shader than in the first arrangement and in the second arrangement, the second cost metric less than the third cost metric.

4. The method of claim 1, determining the first cost metric comprising calculating a first cost for binding the first resource to the first shader and determining the second cost metric comprising calculating a second cost for binding the first resource to the second shader.

5. The method of claim 4, the first and second cost metrics respectively indicative of a number of rebindings necessary to transition the first resource between currently loaded shaders.

6. The method of claim 1, determining the first cost metric, comprising:

computing a number of rebindings necessary to transition the first resource between currently loaded shaders if the first resource is bound to the first shader, and computing a number of wasted slots necessary to render respective shaders if the first resource is bound to the first shader; and determining the second cost metric, comprising:
  computing a number of rebindings necessary to transition the first resource between currently loaded shaders if the first resource is bound to the second shader, and
  computing a number of wasted slots necessary to render respective shaders if the first resource is bound to the second shader.

7. The method of claim 1, comprising binding a third resource to a third shader and a fourth resource to a fourth shader according to the second arrangement.

8. The method of claim 1, the first resource comprising a constant buffer.

9. The method of claim 1, the method performed dynamically at one or more of application run time and load time.

10. A method for assigning resources used by a plurality of shaders of a graphics pipeline, comprising:
  identifying a hierarchical tree comprising a plurality of nodes, respective nodes in the hierarchical tree identifying a shader and an association of the shader to one or more of the resources;
  determining an arrangement of associations of the plurality of shaders to resources in the hierarchical tree; and
  binding the resources to the plurality of shaders based upon the determined arrangement, the determined arrangement having an associated cost metric below a predetermined cost metric,
  at least some of at least one of the identifying, the determining, and the binding implemented at least in part via a processor.

11. The method of claim 10, determining the arrangement of associations comprising determining an arrangement of associations that is different than an initial arrangement of associations.

12. The method of claim 10, the cost metric indicative of a number of required rebindings of resources to shaders if the resources are respectively bound to the shaders as specified in the arrangement.

13. The method of claim 10, comprising:
  determining a second arrangement of associations of the plurality of shaders to resources in the hierarchical tree having an associated second cost metric, the second cost metric greater than the cost metric associated with the determined arrangement.

14. The method of claim 10, comprising determining the cost metric associated with the determined arrangement, comprising:
  computing a number of rebindings necessary to transition respective resources of the one or more resources between currently loaded shaders if the respective resources are bound to the respective shaders as specified in the determined arrangement, and
  computing a number of wasted slots necessary to render respective shaders if the respective resources are bound to the respective shaders as specified in the determined arrangement.

15. The method of claim 10, the one or more resources comprising constant buffers.

16. The method of claim 10, the method performed dynamically at one or more of application run time and load time.

17. A computer readable storage device comprising a graphics application programming interface for instructing a graphics processing unit to perform the method of claim 10.

18. A computer readable storage device comprising computer executable instructions that when executed via a processor perform a method, the method comprising:
  identifying a hierarchical tree comprising a plurality of nodes, respective nodes in the hierarchical tree identifying a shader and an association of the shader to one or more resources;
  determining a first cost metric for a first arrangement of associations of a plurality of shaders to resources in the hierarchical tree, the first arrangement specifying that a first resource is associated with a first shader;
  determining a second cost metric for a second arrangement of associations of the plurality of shaders to resources in the hierarchical tree, the second arrangement specifying that the first resource is associated with a second shader, the second shader different than the first shader; and
  binding the first resource to the second shader when the second cost metric is less than the first cost metric.

19. The computer readable storage device of claim 18, the first arrangement comprising an initial arrangement as determined by a state management system.

* * * * *